(12) United States Patent
Sasaki

(10) Patent No.: US 6,255,040 B1
(45) Date of Patent: Jul. 3, 2001

(54) METHOD OF MANUFACTURING THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/533,927

(22) Filed: Mar. 23, 2000

(30) Foreign Application Priority Data

Mar. 24, 1999 (JP) ................................. 11-079201

(51) Int. Cl.[7] ................................ G03F 7/00; G11B 5/31
(52) U.S. Cl. ........................ 430/320; 430/315; 430/319; 430/396; 29/603.07
(58) Field of Search ................................ 430/314, 315, 430/319, 320, 396; 29/603.07

(56) References Cited

U.S. PATENT DOCUMENTS

| | | |
|---|---|---|
| 5,438,747 | 8/1995 | Krounbi et al. . |
| 5,512,394 * | 4/1996 | Levenson et al. .................... 430/5 |
| 5,600,519 | 2/1997 | Heim et al. . |
| 5,731,109 * | 3/1998 | Hwang ................................... 430/5 |
| 5,853,959 * | 12/1998 | Brand et al. ......................... 430/320 |

FOREIGN PATENT DOCUMENTS

| | | |
|---|---|---|
| 7-141624 * | 6/1995 | (JP) . |
| 7-262519 | 10/1995 | (JP) . |
| 8-249614 | 9/1996 | (JP) . |

* cited by examiner

*Primary Examiner*—John A. McPherson
(74) *Attorney, Agent, or Firm*—Oliff & Berridge, PLC.

(57) ABSTRACT

Provided is a method of manufacturing a thin film magnetic head which can precisely control a pole width and obtain sufficient overwrite properties even when the pole width is reduced. A top pole has a step along the width, which is changed substantially perpendicularly, at a coupling portion between an intermediate portion and an end portion for defining a track width. A photoresist pattern functioning as a mask for forming the top pole is formed by using a negative photoresist. A photomask for forming this photoresist pattern has a concave pattern at a corner of the step along the width. Thus, the corner at the coupling portion between the intermediate and end portions of the top pole has a sharp edge. Thus, even if a throat height is changed, a write track width is not changed. Thus, a stable write track width can be obtained, and the write track width can be narrowed.

15 Claims, 29 Drawing Sheets

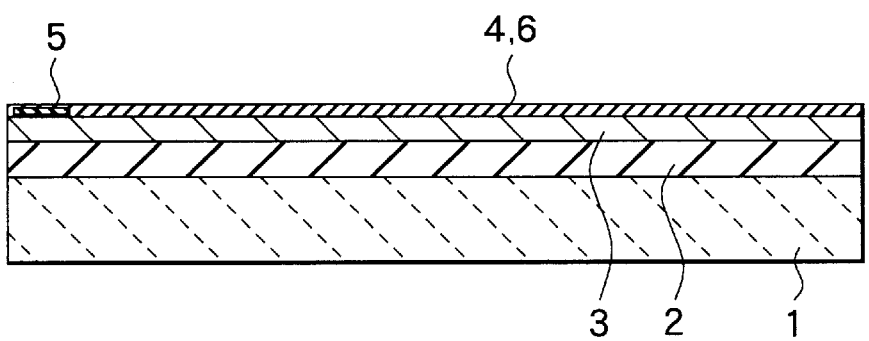 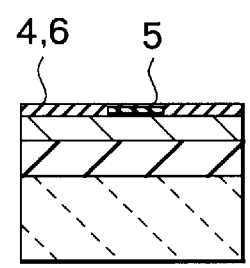
FIG.1A  FIG.1B
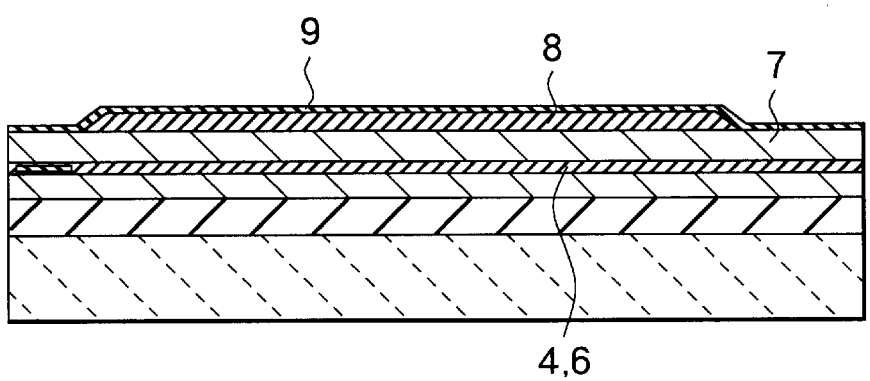 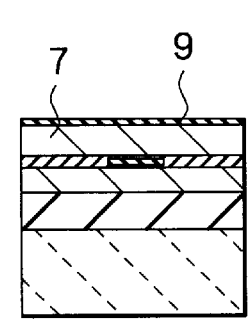
FIG.2A  FIG.2B
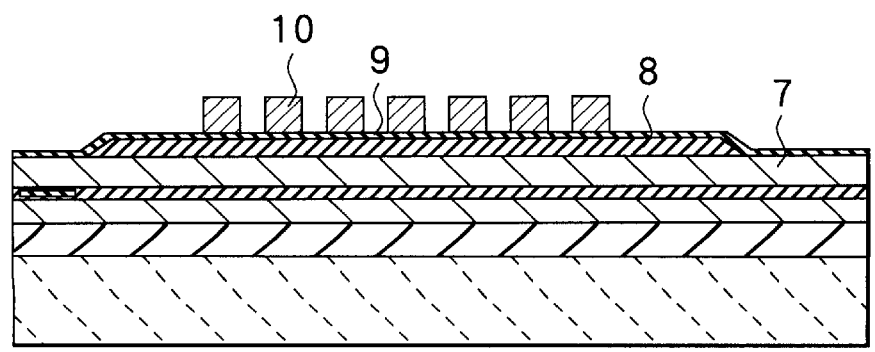 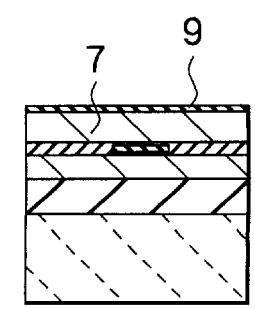
FIG.3A  FIG.3B

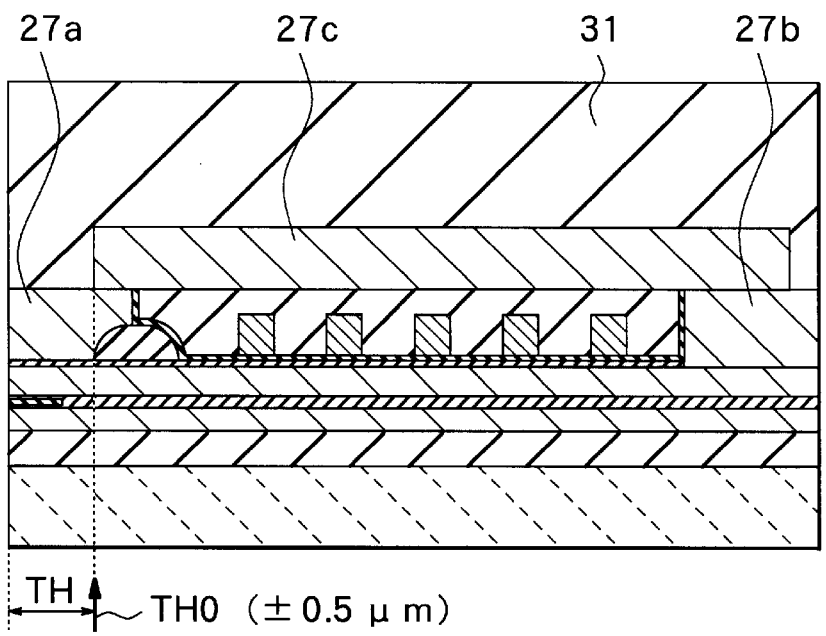
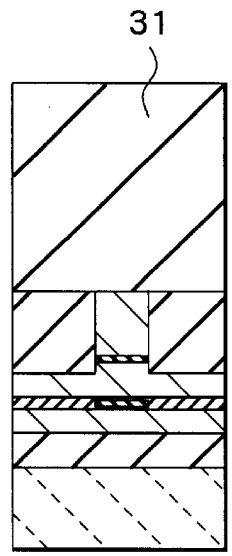
FIG.24A   FIG.24B
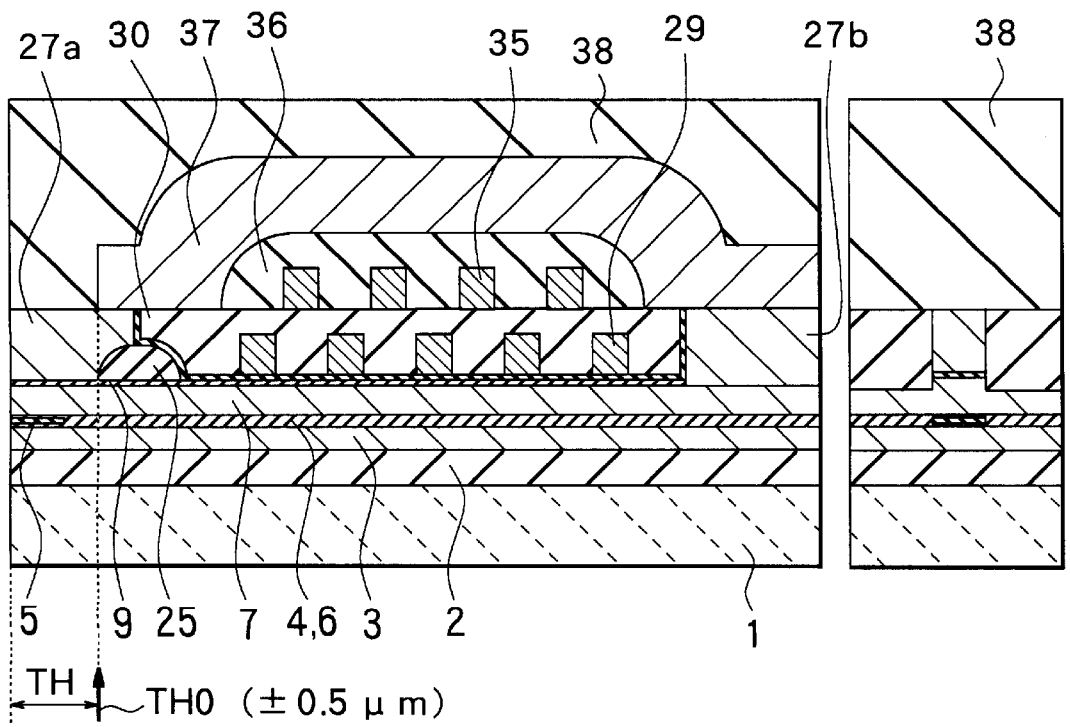
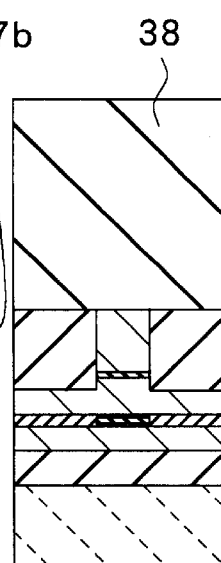
FIG.25A   FIG.25B

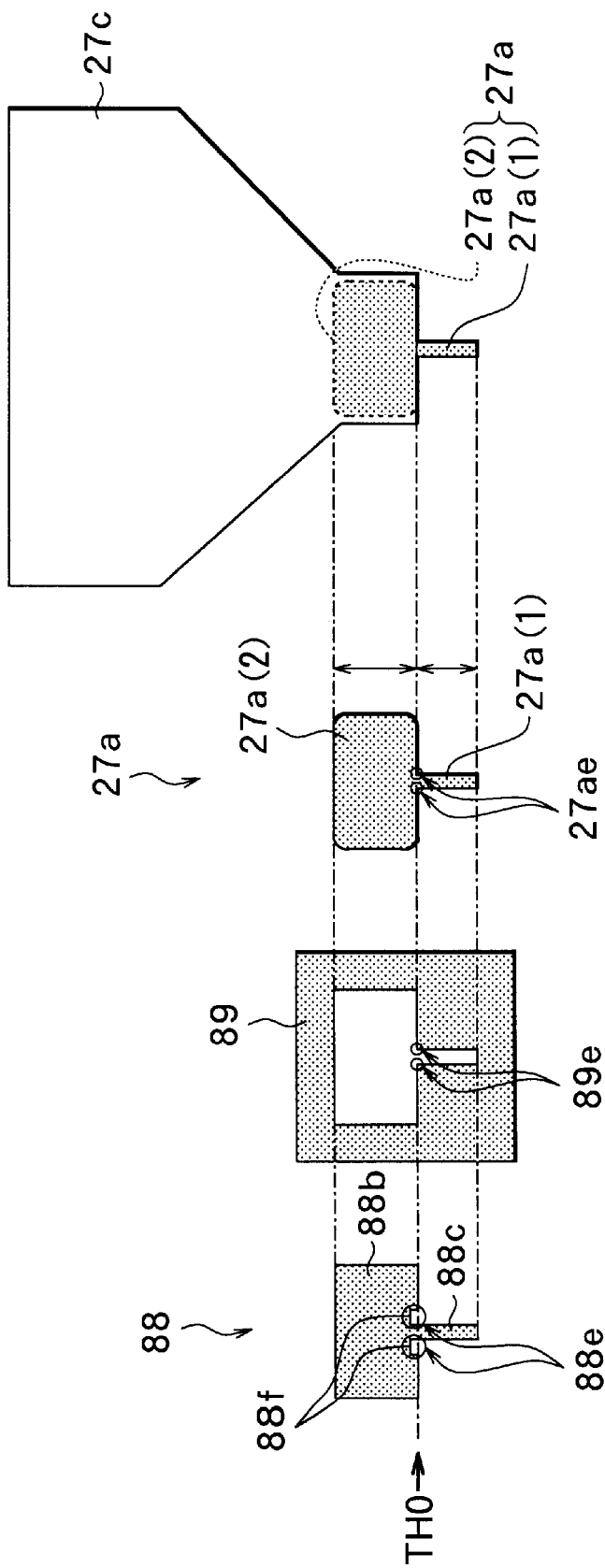

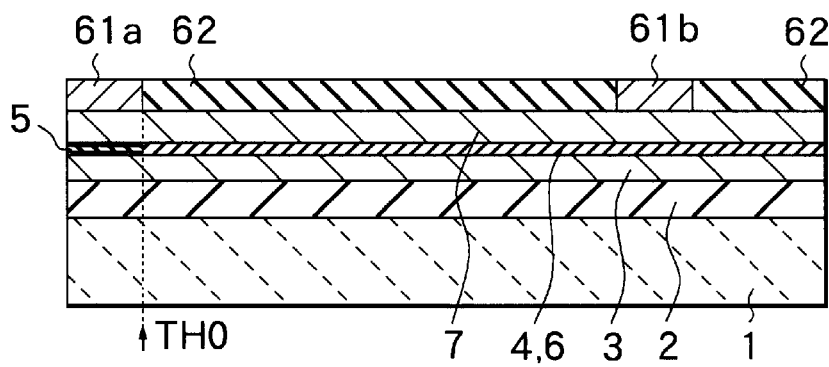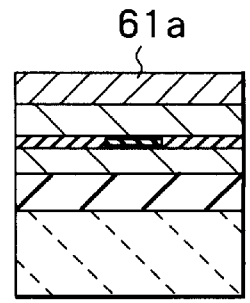
FIG.32A  FIG.32B
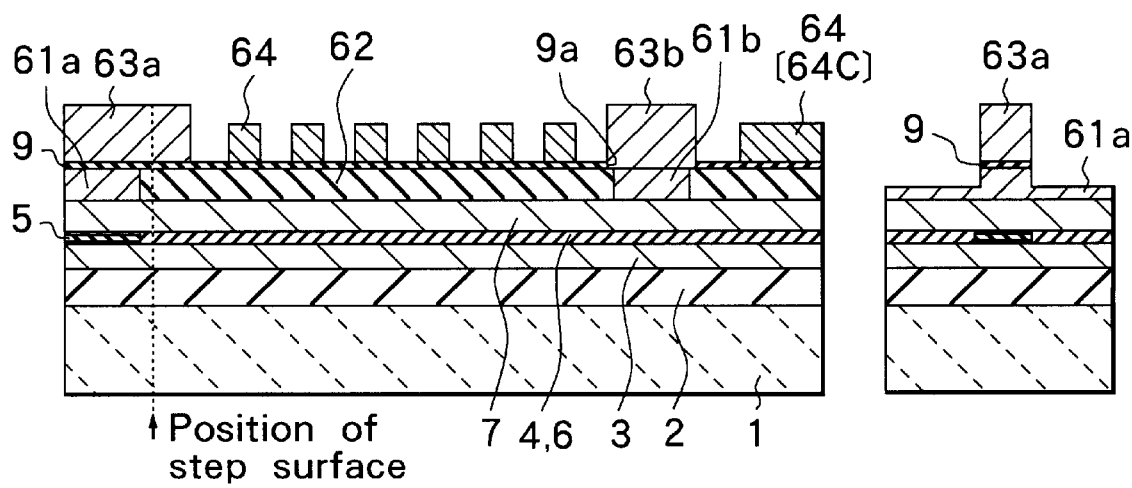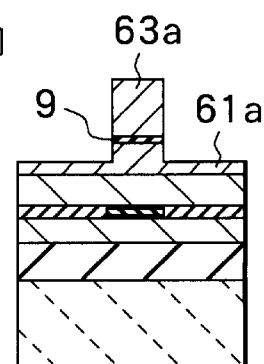
FIG.33A  FIG.33B

METHOD OF MANUFACTURING THIN FILM MAGNETIC HEAD

BACKGROUND OF THE INVENTION

1. Field of the Invention

The invention relates to a method of manufacturing a thin film magnetic head having at least an inductive magnetic transducer.

2. Description of the Related Art

Recently, an improvement in performance of a thin film magnetic head has been sought in accordance with an increase in a surface recording density of a hard disk device. A composite thin film magnetic head is widely used as the thin film magnetic head. The composite thin film magnetic head has a laminated structure comprising a recording head having an inductive magnetic transducer for writing and a reproducing head having a magnetoresistive (hereinafter referred to as MR) element for reading.

MR elements include an AMR element utilizing an anisotropic magnetoresistive (AMR) effect and a GMR element utilizing a giant magnetoresistive (GMR) effect. The reproducing head using the AMR element is called an AMR head or simply an MR head, and the reproducing head using the GMR element is called a GMR head. The AMR head is used as the reproducing head whose surface recording density exceeds 1 gigabit per square inch, and the GMR head is used as the reproducing head whose surface recording density exceeds 3 gigabits per square inch.

The improvement in the performance of the recording head is also sought in accordance with such an improvement in the performance of the reproducing head. Factors for determining the performance of the recording head include a throat height (TH). This throat height means a length (height) of a magnetic pole portion from an air bearing surface to an edge of an insulating layer for electrically isolating thin film coils for generating a magnetic flux. The air bearing surface means the surface of the thin film magnetic head facing a magnetic recording medium and is sometimes called a track surface.

A reduction in the above-mentioned throat height is desired for the improvement in the performance of the recording head. This throat height is also controlled in accordance with an amount of polishing the air bearing surface.

An increase in a recording density of the performance of the recording head requires the increase in a track density of the magnetic recording medium. For this purpose, it is necessary to realize the recording head having a narrow track structure. In this structure, a bottom pole and a top pole, which are formed on the bottom and top of a write gap sandwiched between the bottom pole and the top pole, have a narrow width of from a few microns to the submicron order on the air bearing surface. Semiconductor processing technology is used in order to achieve this structure.

One example of a method of manufacturing the composite thin film magnetic head will be now described as one example of a conventional method of manufacturing the thin film magnetic head with reference to FIGS. 36 to 38. FIGS. 36 to 38 show a cross section of the thin film magnetic head perpendicular to the air bearing surface.

In this manufacturing method, first, as shown in FIG. 36, an insulating layer 102 made of alumina ($Al_2O_3$), for example, is deposited with a thickness of about 5 $\mu$m to 10 $\mu$m on a substrate 101 made of altic ($Al_2O_3$ and TiC), for example. Then, a lower shield layer 103 for the reproducing head is formed on the insulating layer 102. Then, alumina, for example, is sputter deposited with a thickness of 100 nm to 200 nm on the lower shield layer 103, whereby a shield gap film 104 is formed. Then, an MR film 105 for constituting the MR element for reproducing is formed with a thickness of a few tens of nanometers on the shield gap film 104, and the MR film 105 is patterned into a desired shape by high-accuracy photolithography. Then, a lead layer (not shown) for functioning as a lead electrode layer electrically connected to the MR film 105 is formed on both sides of the MR film 105. Then, a shield gap film 106 is formed on the lead layer, the shield gap film 104 and the MR film 105, whereby the MR film 105 is buried in the shield gap films 104 and 106. Then, an upper shield-cum-bottom pole (hereinafter referred to as a bottom pole) 107 made of a magnetic material for use in both of the reproducing head and the recording head, e.g., permalloy (NiFe) is formed on the shield gap film 106.

Then, as shown in FIG. 37, a write gap layer 108 made of an insulating film, e.g., an alumina film is formed on the bottom pole 107, and a photoresist layer 109 is formed into a predetermined pattern on the write gap layer 108 by the high-accuracy photolithography. Then, first-layer thin film coils 110 made of copper (Cu), for example, for an inductive recording head are formed on the photoresist layer 109 by plating method, for example. Then, a photoresist layer 111 is formed into a predetermined pattern by the high-accuracy photolithography so that the photoresist layer 109 and the coils 110 may be coated with the photoresist layer 111. Then, heat treatment takes place at a temperature of 250° C., for example, in order to flatten the coils 110 and provide insulation among the coils 110. Then, second-layer thin film coils 112 made of copper, for example, are formed on the photoresist layer 111 by the plating, for example. Then, a photoresist layer 113 is formed into a predetermined pattern on the photoresist layer 111 and the coils 112 by the high-accuracy photolithography. Then, the heat treatment takes place at a temperature of 250° C., for example, in order to flatten the coils 112 and provide insulation among the coils 112.

Then, as shown in FIG. 38, the write gap layer 108 is partially etched at the rear of the coils 110 and 112 (on the right side in FIG. 38) in order to form a magnetic path, whereby an opening 108a is formed. Then, an upper yoke-cum-top pole (hereinafter referred to as a top pole) 114 made of the magnetic material for the recording head, e.g., permalloy is selectively formed on the write gap layer 108 and the photoresist layers 109, 111 and 113. The top pole 114 is in contact with and magnetically coupled to the bottom pole 107 in the above-mentioned opening 108a. Then, the top pole 114 is used as a mask to etch the write gap layer 108 and the bottom pole 107 by about 0.5 $\mu$m by means of ion milling. Then, an overcoat layer 115 made of alumina, for example, is formed on the top pole 114. Finally, a slider is machined, whereby a track surface (air bearing surface) 120 of the recording head and the reproducing head is formed. As a result, the thin film magnetic head is completed.

FIGS. 39 to 41 show the structure of the completed thin film magnetic head. FIG. 39 shows a cross section of the thin film magnetic head perpendicular to the air bearing surface 120. FIG. 40 shows an enlarged cross section parallel to the air bearing surface 120 in the magnetic pole portion. FIG. 41 shows a plan view. FIGS. 36 to 39 correspond to a cross section taken along line A–A' of FIG. 41. The overcoat layer 115 is not shown in FIGS. 39 to 41.

For the improvement in the performance of the thin film magnetic head, it is important to precisely form the throat height TH, an apex angle θ, a pole width P2W and a pole length P2L shown in FIGS. 39 and 40. The apex angle θ means the angle between a straight line connecting corners of side surfaces of the photoresist layers 109, 111 and 113 close to the track surface and an upper surface of the top pole 114. The pole width P2W defines a write track width on the recording medium. The pole length P2L represents the thickness of the magnetic pole. In FIGS. 39 and 40, a 'TH0 position' means the edge of the photoresist layer 109 that is the insulating layer for electrically isolating the thin film coils 110 and 112, close to the track surface. The TH0 position represents a reference position 0 of the throat height TH.

As shown in FIG. 40, the structure, in which the respective side walls of parts of the top pole 114, the write gap layer 108 and the bottom pole 107 are vertically formed in self-alignment, is called a trim structure. This trim structure allows a prevention of the increase in an effective track width resulting from a spread of the magnetic flux generated during writing on the narrow track. As shown in FIG. 40, a lead layer 121 for functioning as the lead electrode layer electrically connected to the MR film 105 is formed on both sides of the MR film 105. The lead layer 121 is not shown in FIGS. 36 to 39 and 41.

FIG. 42 shows a plan structure of the top pole 114. As shown in this drawing, the top pole 114 has a yoke portion 114a occupying most of the top pole 114, and a pole chip portion 114b having a substantially fixed width W1 as the pole width P2W. An outer edge of the yoke portion 114a forms an angle α with the surface parallel to the air bearing surface 120 at a coupling portion between the yoke portion 114a and the pole chip portion 114b. Moreover, the outer edge of the pole chip portion 114b forms an angle β with the surface parallel to the air bearing surface 120 at the above-mentioned coupling portion. In this case, α is about 45 degrees, for example, and β is 90 degrees. The width of the pole chip portion 114b defines the write track width on the recording medium. The pole chip portion 114b includes a portion F in front of the TH0 position (close to the air bearing surface 120) and a portion R at the rear of the TH0 position (close to the yoke portion 114a). As can be seen from FIG. 39, the portion F extends on the flat write gap layer 108, and the portion R and the yoke portion 114a extend on a coil portion (hereinafter referred to as an apex portion) which is coated with the photoresist layers 109, 111 and 113 and rises mountainously.

The shape of the top pole is described in Japanese Patent Laid-open No. Hei 8-249614, for example.

The pole width P2W is required to be precisely formed in order to determine the track width of the recording head. More particularly, microfabrication for reducing the pole width P2W of the top pole to 1.0 μm or less in dimension has been recently required in order to enable recording at high surface density, that is, in order to form the recording head having the narrow track structure.

Frame plating method is used as the method of forming the top pole, as disclosed in Japanese Patent Laid-open No. Hei 7-262519, for instance. To form the top pole 114 by using the frame plating, a thin electrode film made of permalloy, for example, is first formed over the apex portion by sputtering, for example. Then, the electrode film is coated with a photoresist, and the photoresist is patterned by photolithography process, whereby a frame for plating is formed. Then, the top pole 114 is formed by the plating by using the previously formed electrode film as a seed layer.

On the other hand, a difference in height between the apex portion and the other portions is 7 μm to 10 μm or more, for example. This apex portion is coated with the photoresist with a thickness of 3 μm to 4 μm. Assuming that the photoresist on the apex portion requires a film thickness of 3 μm or more at the minimum, a photoresist film having a thickness of 8 μm to 10 μm or more, for example, is formed under the apex portion because the photoresist having fluidity collects at the lower place.

In order to form the narrow track as described above, it is necessary to form a frame pattern of about 1.0 μm in width by the photoresist film. That is, a micro pattern of 1.0 μm or less in width must be formed by the photoresist film of 8 μm to 10 μm or more in thickness. However, it is very difficult for a manufacturing process to form such a thick photoresist pattern with a narrow pattern width.

Moreover, during exposure for the photolithography, a light for the exposure is reflected by an underlying electrode film serving as the seed layer. A peripheral region of the photoresist coated with a photomask is exposed to this reflected light. This causes a deformation or the like in the photoresist pattern, and thus a sharp and precise photoresist pattern cannot be obtained. Consequently, the top pole cannot be formed into a desired shape, e.g., the side wall of the top pole is round in shape. For example, when an attempt is made to further reduce the pole width P2W to W1A as shown in FIG. 43 by using a positive photoresist as the photoresist, it is further difficult to obtain this desired width W1A. This is caused for the following reason. In the portion R of the pole chip portion 114b extending on the apex portion, the returned light reflected by the underlying electrode film includes not only the vertically reflected light but also the light reflected obliquely or transversely from an inclined surface of the apex portion. As a result of these reflected lights having an influence upon the exposure of the photoresist layer, a photoresist pattern width for defining the pole width P2W is larger than an intended value. As a consequence, the shape of the pole width P2W becomes the shape shown by a solid line in FIG. 43. In this drawing, a broken line represents the shape of a photomask 130 used for patterning the photoresist.

The width of the portion F of the pole chip portion 114b in front of the TH0 position is a very important factor for defining the track width on the recording medium. Thus, when the width of the portion F is larger than the above-mentioned value W1A, an intended minute track width cannot be obtained.

On the other hand, the improvement in, for example, so-called NLTS (Non-Linear Transition Shift) properties requires minimization of the length of the magnetic path, i.e., the length of the portion to be the path of the magnetic flux generated by the thin film coils. Thus, a sufficient reduction in the throat height TH is required. NLTS expresses, as a percentage, an amount of shift of an actual magnetic recording position from an ideal magnetic recording position on the disk. For example, as shown in FIG. 44, when the amount of polishing is increased during formation of the air bearing surface 120 and thereby the throat height TH is reduced compared to the throat height TH of FIG. 43, a width W1B of the pole chip 114b on the air bearing surface is surely larger than the width W1A of the pole chip 114b of FIG. 43. It is therefore difficult to obtain the intended minute track width.

Such a problem similarly exists in the magnetic head described in Japanese Patent Laid-open No. Hei 8-249614 mentioned above. In the magnetic head described in this publication, the pole width is gradually changed from the TH0 position toward the yoke portion. Thus, the light reflected obliquely or transversely from the inclined surface of the apex portion has a considerable influence upon the exposure of the photoresist layer. Therefore, the width of the portion in front of the TH0 position cannot be precisely controlled.

Moreover, as shown in FIGS. 43 and 44, the portion R of the pole chip portion 114b at the rear of the TH0 position has substantially the same width as the width of the portion F in front of the TH0 position, and thus the portion R has a small cross-sectional area. Thus, the magnetic flux from the yoke portion 114a is saturated in the portion R, and therefore the magnetic flux cannot sufficiently reach to the portion F for defining the track width. Thus, the following problem exists. Overwrite properties, i.e., the properties of overwriting data on the data already written on the recording medium is as low as about 10 dB to 20 dB, for example. Consequently, sufficient overwrite properties cannot be ensured.

For example, as shown in FIGS. 45A and 45B, a so-called stitched pole type thin film magnetic head is also proposed. Specifically, another pole chip portion 118a having the width narrower than the width of the pole chip portion 114b is formed under the pole chip portion 114b that is a part of the top pole 114, and the pole chip portion 118a is magnetically coupled to the pole chip portion 114b. In this drawing, the first-layer thin film coils 110 are located on a thick insulating layer 116 formed on the write gap layer 108, and a magnetic layer 118b formed by the same process as the process of the pole chip portion 118a is located at the rear of the insulating layer 116. According to this thin film magnetic head, the pole chip portion 118a is formed on the flat write gap layer 108, and thus it is relatively easy to reduce the width of the pole chip portion 118a for delimiting the track width on the recording medium. Therefore, the write track width on the recording medium can be reduced. However, also in this type of thin film magnetic head, the photoresist pattern of the portion associated with the formation of the pole chip portion 118a may be spread along the width by the influence of the reflected light from an underlying layer during the exposure. As a result, it is difficult to make the width of the pole chip portion 118a uniform and sufficiently narrow.

The invention is designed to overcome the foregoing problems. It is an object of the invention to provide a method of manufacturing a thin film magnetic head which can precisely control the pole width and can obtain sufficient overwrite properties even when the pole width is reduced.

SUMMARY OF THE INVENTION

A method of manufacturing a thin film magnetic head of the invention is a method of manufacturing a thin film magnetic head comprising at least two magnetic layers magnetically coupled to each other and having a part facing a recording medium, the part including two magnetic poles facing each other with a gap layer sandwiched therebetween; and a thin film coil portion located between these at least two magnetic layers with an insulating layer sandwiched therebetween, wherein at least one of the two magnetic layers has a first magnetic layer portion extending from a surface facing the recording medium to an edge portion of the insulating layer close to the recording medium or to near the edge portion and having a fixed width for defining a write track width on the recording medium; a second magnetic layer portion having the width larger than the width of the first magnetic layer portion and magnetically coupled to the first magnetic layer portion at the edge portion of the insulating layer or near the edge portion; and a step along the width formed at a coupling portion between the first magnetic layer portion and the second magnetic layer portion. The method comprises the steps of: performing a photolithography process by using a light-shield mask having a basic shape corresponding to the shapes of the first magnetic layer portion and the second magnetic layer portion and having a concave or convex pattern at a corner corresponding to the step of the coupling portion, thereby forming a photoresist pattern having a predetermined shape; and selectively forming the one magnetic layer by using the formed photoresist pattern.

In the method of manufacturing the thin film magnetic head of the invention, the photolithography process is performed by using the light-shield mask, whereby the photoresist pattern having a predetermined shape is formed. The light-shield mask has the concave or convex pattern at the position corresponding to the corner of the step of the coupling portion between the first and second magnetic layer portions of the one magnetic layer. Thus, the presence of the pattern allows an exposure of the corner to be controlled and made correct. Then, the one magnetic layer is selectively formed by using the formed photoresist pattern. It is thus possible to prevent the corner of the step along the width at the coupling portion from being rounded. As a result, an increase in a substantial width of the first magnetic layer portion is avoided.

In the method of manufacturing the thin film magnetic head of the invention, a negative photoresist, which allows a region exposed by the photolithography process to remain, may be used as the photoresist. In this case, preferably, the light-shield mask having the concave pattern for reducing the exposure of the corner is used as the light-shield mask.

Moreover, in the method of manufacturing the thin film magnetic head of the invention, a positive photoresist, which allows the region not exposed by the photolithography process to remain, may be used as the photoresist. In this case, preferably, the light-shield mask having the convex pattern for reducing the exposure of the corner is used as the light-shield mask.

Moreover, in the method of manufacturing the thin film magnetic head of the invention, preferably, the light-shield mask whose pattern portion corresponding to the first magnetic layer portion has a fixed width is used as the light-shield mask.

Moreover, in the method of manufacturing the thin film magnetic head of the invention, when the one magnetic layer further includes a third magnetic layer portion, the first, second and third magnetic layer portions may be integrally formed by using the light-shield mask having the shape corresponding to the first, second and third magnetic layer portions. Alternatively, the first and second magnetic layer portions are formed by using the light-shield mask having the shape corresponding to the first and second magnetic layer portions, and then the third magnetic layer portion may be separately formed by using a second light-shield mask having the shape corresponding to the third magnetic layer portion.

Moreover, in the method of manufacturing the thin film magnetic head of the invention, the light-shield mask having the shape, which enables the direction of a step surface of the second magnetic layer portion at the coupling portion to be perpendicular to the direction in which the first magnetic layer portion extends, may be used as the light-shield mask.

Moreover, in the method of manufacturing the thin film magnetic head of the invention, preferably, the light-shield mask is positioned so that the position of the step of the coupling portion may match the position of the edge portion of the insulating layer close to the recording medium, and then the photolithography process is performed.

Moreover, in the method of manufacturing the thin film magnetic head of the invention, the concave or convex pattern may have straight contours. In this case, the contours may form a part of a rectangle, for example. Preferably, one side of the rectangle has a length of 0.1 µm to 0.7 µm, and the other side perpendicular to the one side has a length of 0.3 µm to 2.5 µm.

Moreover, in the method of manufacturing the thin film magnetic head of the invention, the concave or convex pattern may have smoothly curved contours. In this case, the contours may form a part of a circle or an ellipse, for example.

Other and further objects, features and advantages of the invention will appear more fully from the following description.

BRIEF DESCRIPTION OF THE DRAWINGS

FIGS. 1A and 1B are cross sectional views for describing one process of a method of manufacturing a thin film magnetic head according to a first embodiment of the invention;

FIGS. 2A and 2B are cross sectional views for describing the process following the process of FIGS. 1A and 1B;

FIGS. 3A and 3B are cross sectional views for describing the process following the process of FIGS. 2A and 2B;

FIGS. 24A and 24B are cross sectional views for describing the process following the process of FIGS. 23A and 23B;

FIGS. 25A and 25B are cross sectional views of an alternative to the thin film magnetic head manufactured by the method of manufacturing the thin film magnetic head according to the third embodiment;

FIGS. 27A to 27D are plan views of the plan structures of the top pole chip of the thin film magnetic head manufactured by the method of manufacturing the thin film magnetic head according to the third embodiment and the photomask and the photoresist pattern for use in a photolithography process for forming the top pole chip;

FIGS. 32A and 32B are cross sectional views for describing one process of the method of manufacturing the thin film magnetic head according to a fifth embodiment of the invention;

FIGS. 33A and 33B are cross sectional views of the process following the process of FIGS. 32A and 32B;

DETAILED DESCRIPTION OF THE PREFERRED EMBODIMENTS

Figures 4A, 4B:
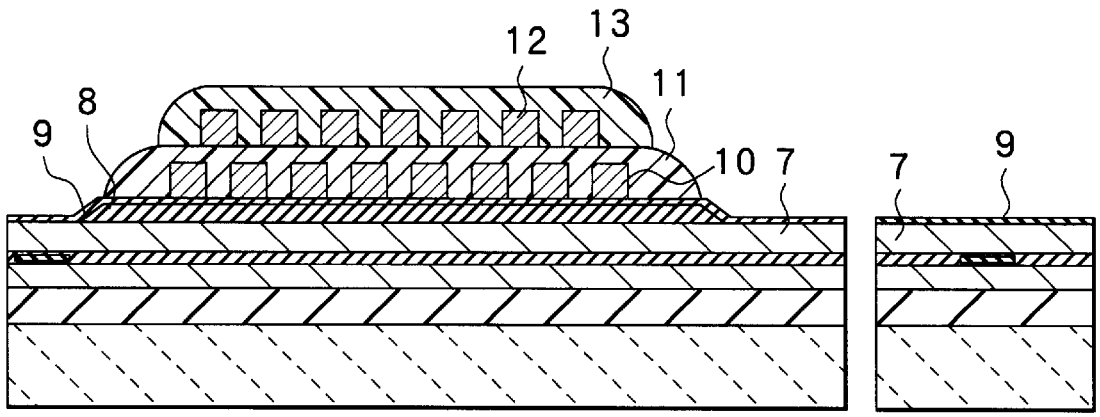
FIGS. 4A and 4B are cross sectional views for describing the process following the process of FIGS. 3A and 3B.

Embodiments of the invention will be described in detail below with reference to the accompanying drawings.

[First Embodiment]

First, a method of manufacturing a thin film magnetic head according to a first embodiment of the invention will be described with reference to FIGS. 1A to 8. In this embodiment, the thin film magnetic head will be described as a composite thin film magnetic head comprising a recording head and a reproducing head. FIGS. 1A, 2A, 3A, 4A, 5A, 6A and 7A show a cross section perpendicular to an air bearing surface. FIGS. 1B, 2B, 3B, 4B, 5B, 6B and 7B show the cross section parallel to the air bearing surface in a magnetic pole portion. FIG. 8 shows a plan structure of the composite thin film magnetic head.

In the manufacturing method according to this embodiment, first, as shown in FIGS. 1A and 1B, an insulating layer 2 made of alumina ($Al_2O_3$), for example, is deposited with a thickness of about 3 $\mu$m to 5 $\mu$m on a substrate 1 made of altic ($Al_2O_3$ and TiC), for example. Then, permalloy (NiFe) is selectively formed with a thickness of about 3 $\mu$m on the insulating layer 2 by plating using a photoresist film as a mask, whereby a lower shield layer 3 for the reproducing head is formed.

Then, alumina, for example, is sputter deposited with a thickness of 100 nm to 200 nm on the lower shield layer 3, whereby a shield gap film 4 is formed. Then, an MR film 5 for constituting an MR element for reproducing is formed with a thickness of a few tens of nanometers or less on the shield gap film 4, and the MR film 5 is formed into a desired shape by high-accuracy photolithography. Then, a lead layer (not shown) for functioning as a lead electrode layer electrically connected to the MR film 5 is formed on both the sides of the MR film 5. Then, a shield gap film 6 is formed on the lead layer, the shield gap film 4 and the MR film 5, whereby the MR film 5 is buried in the shield gap films 4 and 6.

Then, as shown in FIGS. 2A and 2B, an upper shield-cum-bottom pole (hereinafter referred to as a bottom pole) 7 made of permalloy, for example, is selectively formed with a thickness of about 3 $\mu$m to 4 $\mu$m on the shield gap film 6. The bottom pole 7 corresponds to one of "at least two magnetic layers" of the invention.

Then, an inorganic insulating film, e.g., a silicon oxide film ($SiO_2$) is formed with a thickness of about 1 $\mu$m to 2 $\mu$m on the bottom pole 7. Then, this film is taper etched and thus selectively patterned, whereby an insulating layer 8 for defining an apex angle and a throat height is formed. The insulating layer 8 is not limited to the silicon oxide film, and an alumina film or any other inorganic insulating film such as a silicon nitride film (SiN) may be used as the insulating layer 8. Moreover, the above-mentioned film may be formed by sputtering or CVD (Chemical Vapor Deposition) method. Then, a write gap layer 9 made of the insulating film, e.g., the alumina film is formed on the bottom pole 7 and the insulating layer 8.

Then, as shown in FIGS. 3A and 3B, first-layer thin film coils 10 made of copper (Cu), for example, for an inductive recording head are formed with a thickness of 2 $\mu$m to 3 $\mu$m on the write gap layer 9 by electroplating method, for example.

Then, as shown in FIGS. 4A and 4B, a photoresist layer 11 is formed into a predetermined pattern on the write gap layer 9 and the coils 10 by the high-accuracy photolithography. Then, heat treatment takes place at a temperature of 250° C., for example, in order to flatten the coils 10 and provide insulation among the coils 10.

Then, second-layer thin film coils 12 made of copper, for example, are formed with a thickness of 2 $\mu$m to 3 $\mu$m on the photoresist layer 11 by the electroplating, for example. Then, a photoresist layer 13 is formed into a predetermined pattern on the photoresist layer 11 and the coils 12 by the high-accuracy photolithography. Then, the heat treatment takes place at a temperature of 250° C., for example, in order to flatten the coils 12 and provide insulation among the coils 12.

Figures 5A, 5B:
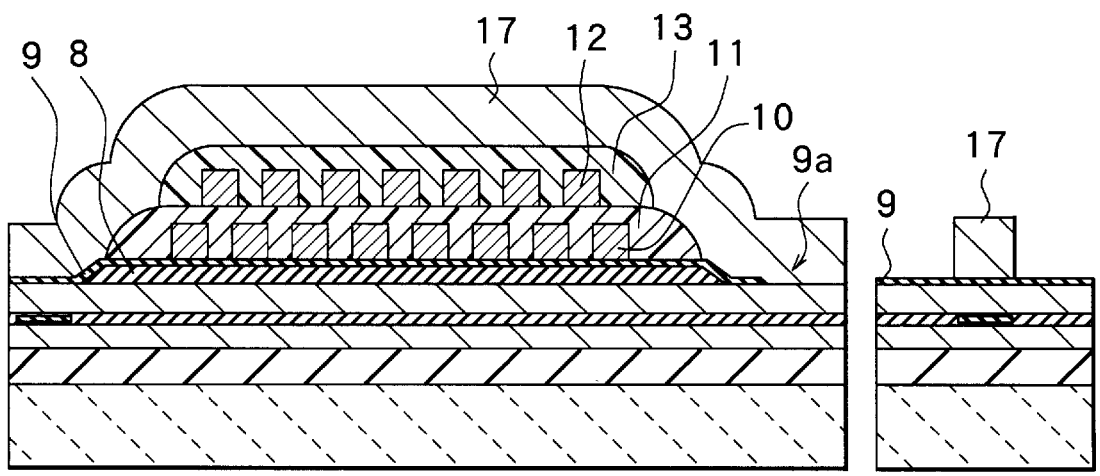
FIGS. 5A and 5B are cross sectional views for describing the process following the process of FIGS. 4A and 4B.

Then, as shown in FIGS. 5A and 5B, the write gap layer 9 is partially etched at the rear of the coils 10 and 12 (on the right side in FIG. 5A) in order to form a magnetic path, whereby an opening 9a is formed. Then, before formation of a top pole, a NiFe alloy, a material having high saturation magnetic flux density is formed with a thickness of about 70 nm by the sputtering, for instance, whereby an electrode film (not shown) to be used as a seed layer for the electroplating is formed.

Then, the above-mentioned electrode film is coated with a photoresist, and this photoresist is patterned by photolithography process, whereby a photoresist pattern to be used as a frame for forming the top pole by frame plating is formed. More specifically, the photoresist is selectively exposed to light by use of a photomask 81 having a shape shown in FIG. 10A, for example, whereby a photoresist pattern 82 having a shape shown in FIG. 10B is formed. A metal film such as chromium (Cr), for example, is used as the photomask 81. In this embodiment, a negative (reversal) photoresist, only the exposed portion of which remains by development after exposure, is used as the photoresist pattern 82. Details of the characteristic shape of the photomask 81 and the shape of the photoresist pattern 82 obtained by the photomask 81 will be described below. The photomask 81 corresponds to one specific example of "a light-shield mask" of the invention. The photoresist pattern 82 corresponds to one specific example of "a photoresist pattern" of the invention.

Then, the photoresist pattern 82 is used as a frame mask to grow a plated layer by the electroplating using the previously formed electrode film as the seed layer, whereby an upper yoke-cum-top pole (hereinafter referred to as a top pole) 17 is formed with a thickness of about 3 μm to 5 μm. Then, the photoresist pattern 82 is removed. The top pole 17 has a plan shape shown in FIG. 9 or 10C, for instance, and the top pole 17 is in contact with and magnetically coupled to the bottom pole 7 in the above-mentioned opening 9a. For example, a high-saturation magnetic material such as permalloy (NiFe) or iron nitride (FeN) is used as the top pole 17. The shape of the top pole 17 will be described below. The top pole 17 corresponds to one specific example of "at least one of two magnetic layers" of the invention.

Figures 6A, 6B:
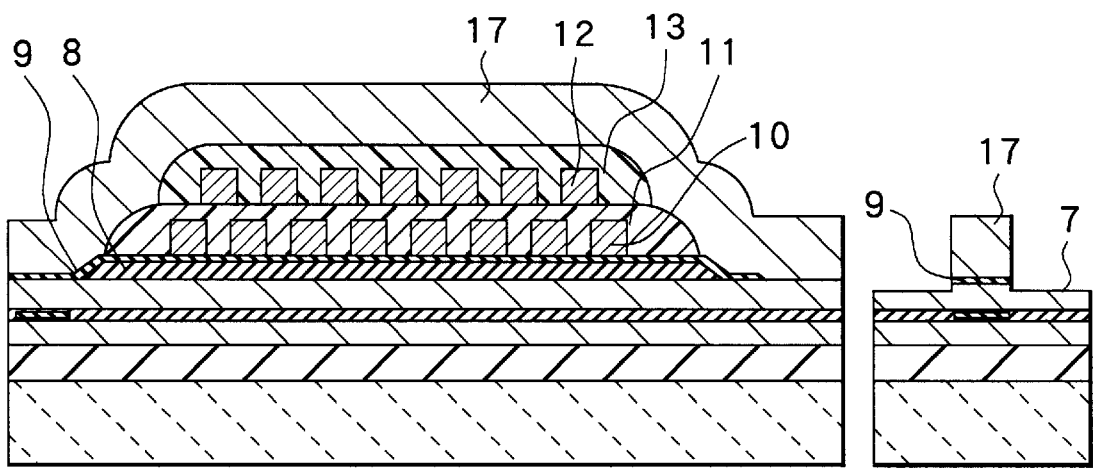
FIGS. 6A and 6B are cross sectional views for describing the process following the process of FIGS. 5A and 5B.

Then, as shown in FIGS. 6A and 6B, the write gap layer 9 and the bottom pole 7 are etched by about 0.5 μm by means of, for example, ion milling using the top pole 17 as the mask, whereby a trim structure is formed.

Figures 7A, 7B:
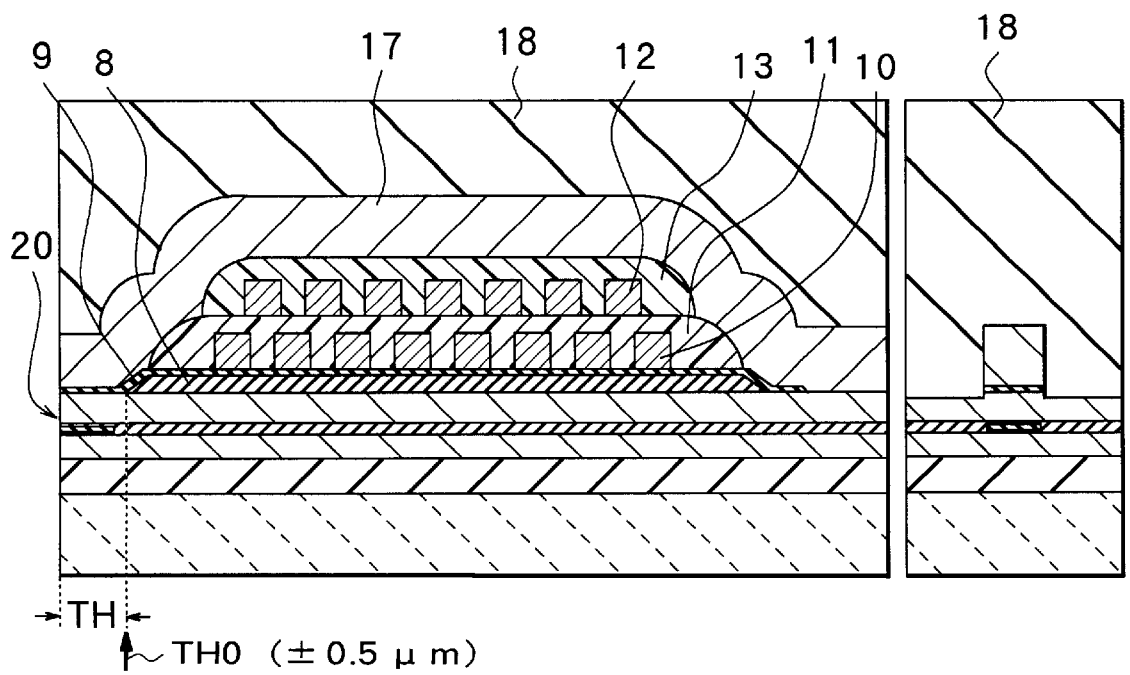
FIGS. 7A and 7B are cross sectional views for describing the process following the process of FIGS. 6A and 6B.
Figure 8:
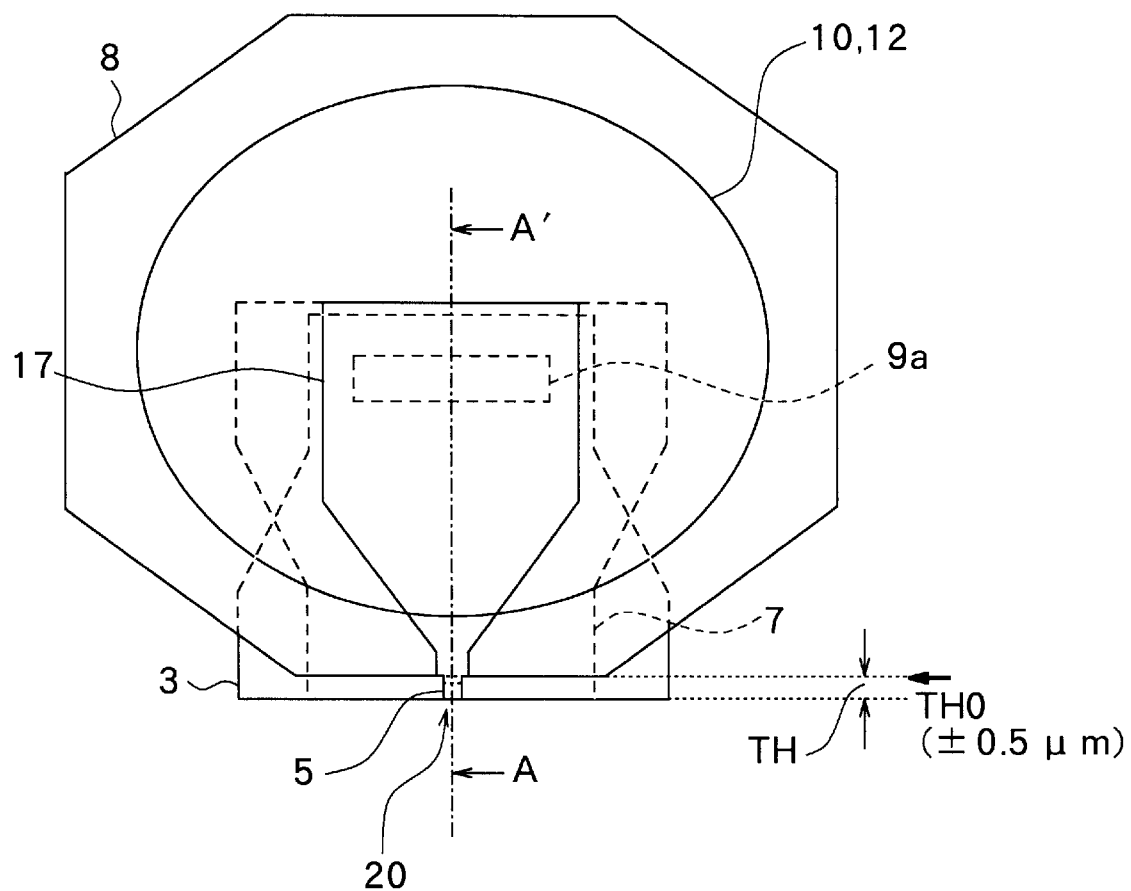
FIG. 8 is a plan view of a plan structure of the completed thin film magnetic head.

Then, as shown in FIGS. 7A and 7B, an overcoat layer 18 made of alumina, for example, is formed so that the whole surface may be coated with the overcoat layer 18. Finally, a slider is machined, whereby the air bearing surface (track surface) of the recording head and the reproducing head is formed. As a result, the thin film magnetic head is completed.

FIG. 8 is a plan view of the thin film magnetic head manufactured by the manufacturing method according to this embodiment. The overcoat layer 18 is not shown in this drawing. As shown in this drawing, a throat height TH means a length between an edge (a TH0 position) of the insulating layer 8 close to the magnetic pole portion and an air bearing surface 20. FIGS. 1A to 7B correspond to the cross section taken along line A–A' of FIG. 8.

Figure 9:
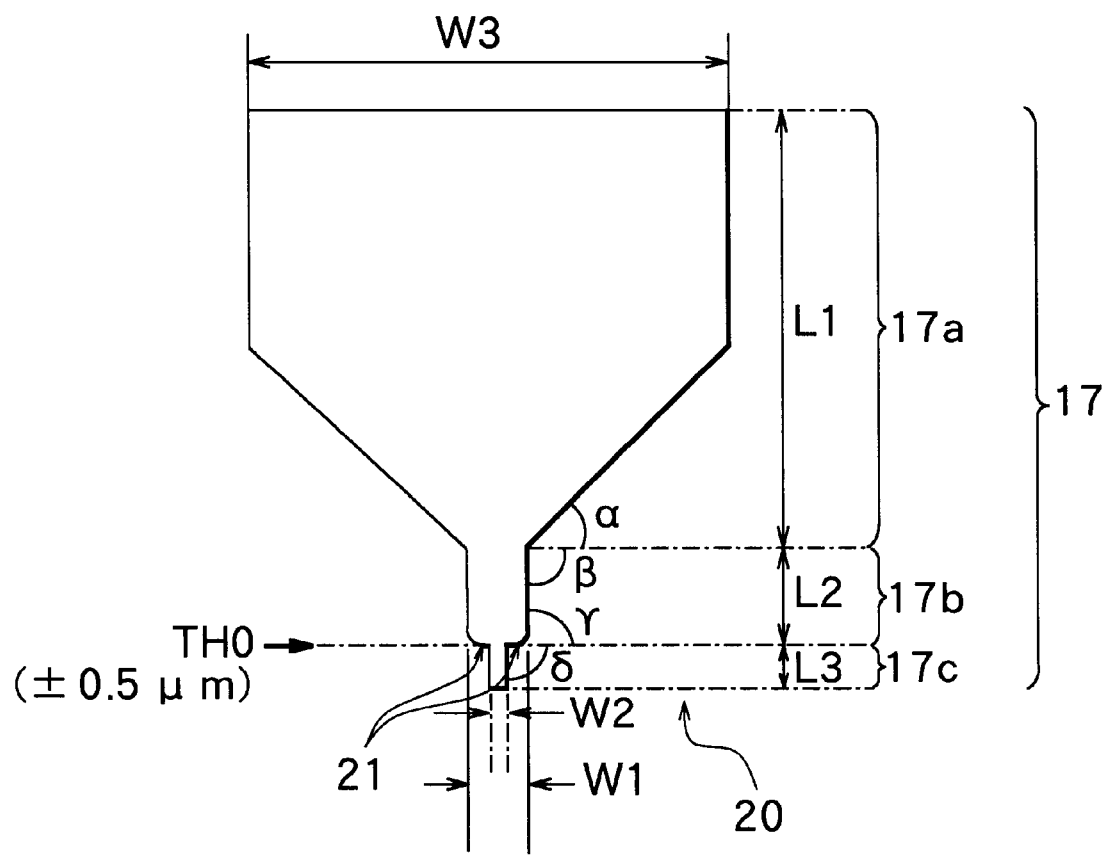
FIG. 9 is a plan view of the plan structure of a top pole of the thin film magnetic head shown in FIG. 8.

FIG. 9 shows the plan structure of the top pole 17. As shown in this drawing, the top pole 17 has a yoke portion 17a having a width W3 and occupying most of the top pole 17, an intermediate portion 17b having a substantially fixed width W1, and an end portion 17c having a substantially fixed width W2 smaller than the width W1. The centers of the yoke portion 17a, the intermediate portion 17b and the end portion 17c along the width match one another. An outer edge of the yoke portion 17a forms an angle α with the surface parallel to the air bearing surface 20 at a coupling portion between the yoke portion 17a and the intermediate portion 17b. Moreover, a side edge surface of the intermediate portion 17b forms an angle β with the surface parallel to the air bearing surface 20 at the above-mentioned coupling portion. The width of the intermediate portion 17b is substantially fixed regardless of the position thereof. The width of the end portion 17c is also substantially fixed regardless of the position thereof. In this embodiment, for example, α is about 45 degrees and β is about 90 degrees.

The coupling portion between the intermediate portion 17b and the end portion 17c of the top pole 17 is located at the TH0 position or near the TH0 position. The position "near the TH0 position" means that the position is within a range of, for example, plus or minus 0.5 μm with respect to the TH0 position. The width of the intermediate portion 17b is W1 at the above-mentioned coupling portion, while the width of the end portion 17c is W2 smaller than W1 at the above-mentioned coupling portion. That is, there is a step along the width between the intermediate portion 17b and the end portion 17c at the TH0 position or near the TH0 position. An end surface (hereinafter referred to as a step surface) 21 of this step portion close to the intermediate portion 17b forms an angle γ with the side edge surface of the intermediate portion 17b. The step surface 21 forms an angle δ with the direction of the side edge surface of the end portion 17c (i.e., the direction in which the end portion 17c extends). In this embodiment, both of the angles γ and δ are about 90 degrees. That is, the step surface 21 located at a boundary between the end portion 17c and the intermediate portion 17b is perpendicular to the side edge surface of the end portion 17c. A corner, at which the side edge surface of the end portion 17c crosses the step surface 21, has a sharp edge as described below. Preferably, the angle δ is within a range of from 75 degrees to 120 degrees, for example. Most preferably, the angle δ is exactly 90 degrees. The end portion 17c of the top pole 17 corresponds to one specific example of "a first magnetic layer portion" of the invention. The intermediate portion 17b corresponds to one specific example of "a second magnetic layer portion" of the invention. The yoke portion 17a corresponds to one specific example of "a third magnetic layer portion" of the invention.

Figure 40:
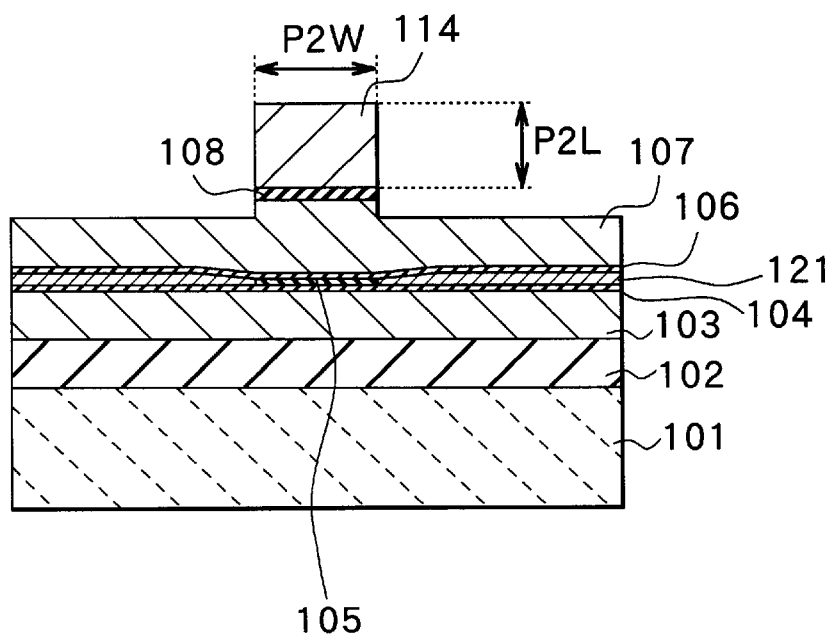
FIG. 40 is a cross sectional view of a cross section of the conventional thin film magnetic head, parallel to an air bearing surface.
Figure 41:
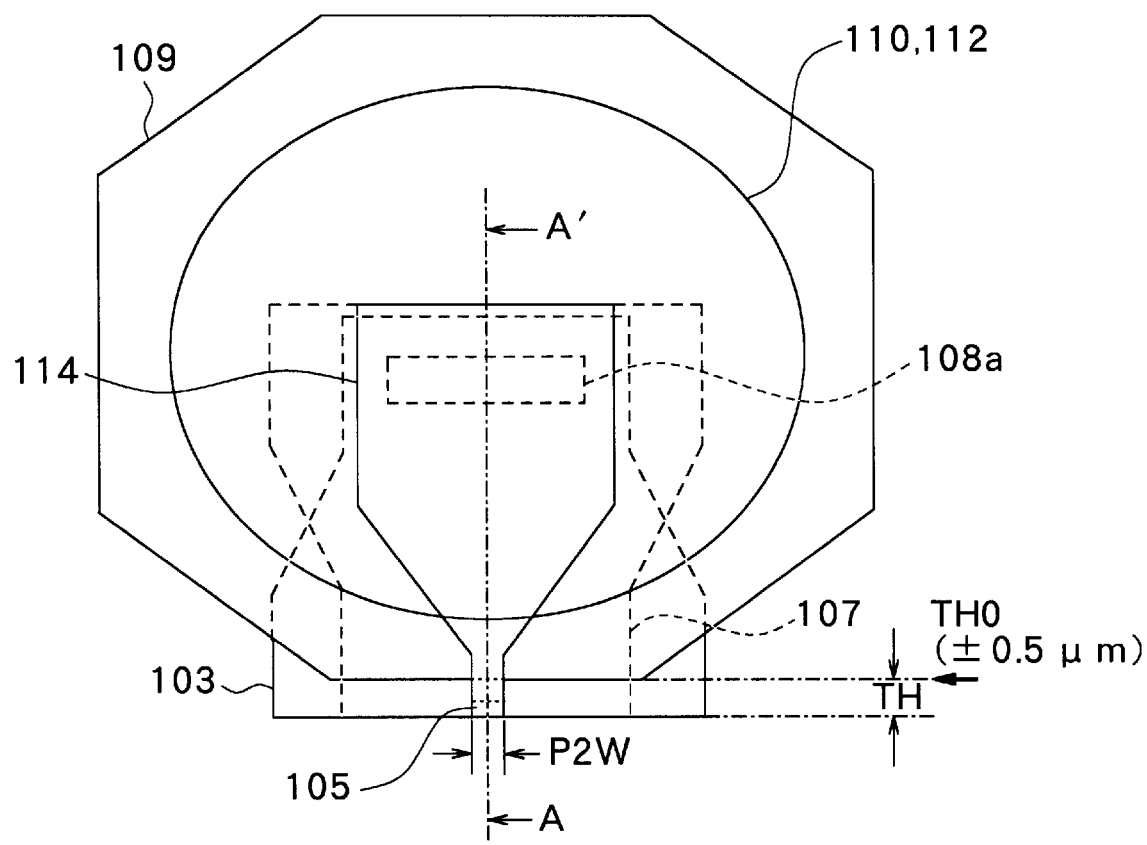
FIG. 41 is a plan view of the structure of the conventional thin film magnetic head.
Figure 42:
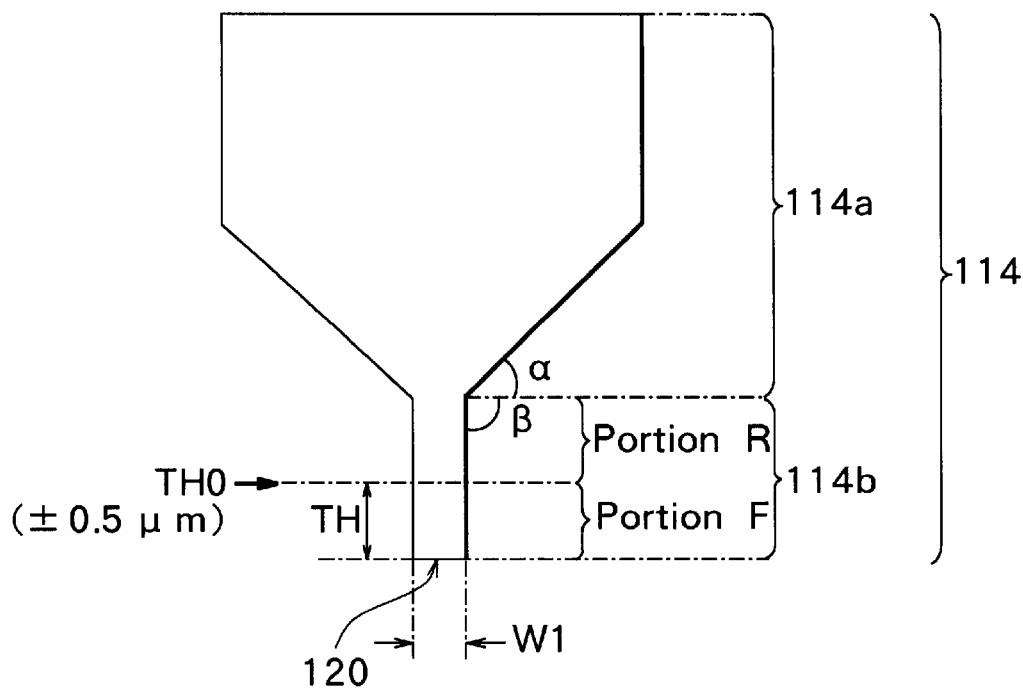
FIG. 42 is a plan view of the structure of the top pole of the conventional thin film magnetic head.
Figure 43:
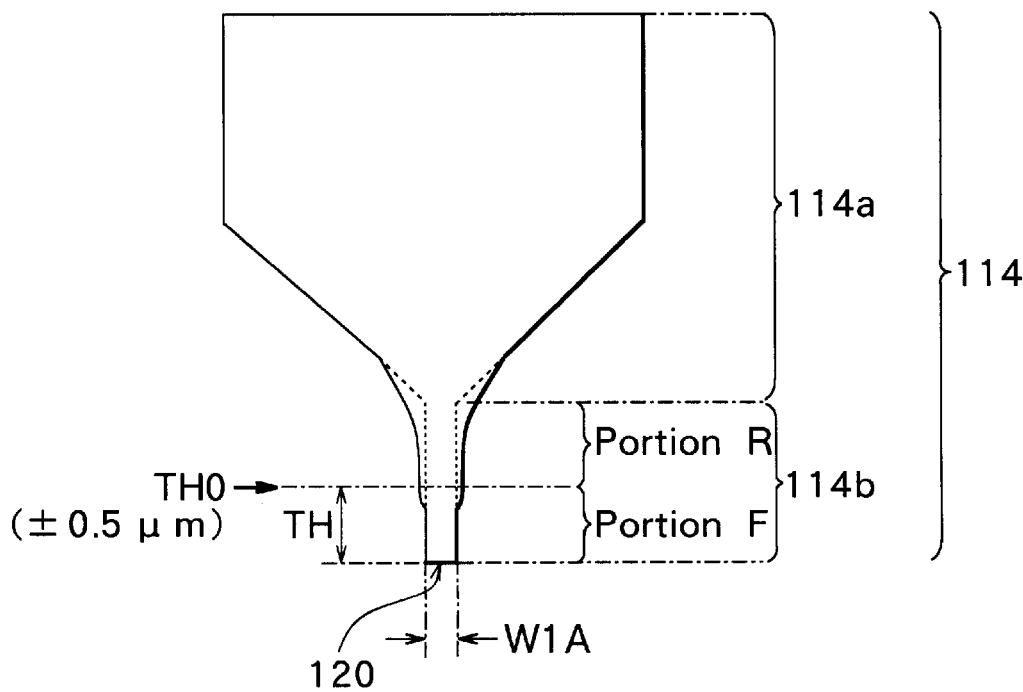
FIG. 43 is a plan view of the top pole for describing a problem of scale-down of the top pole of the conventional thin film magnetic head.
Figure 44:
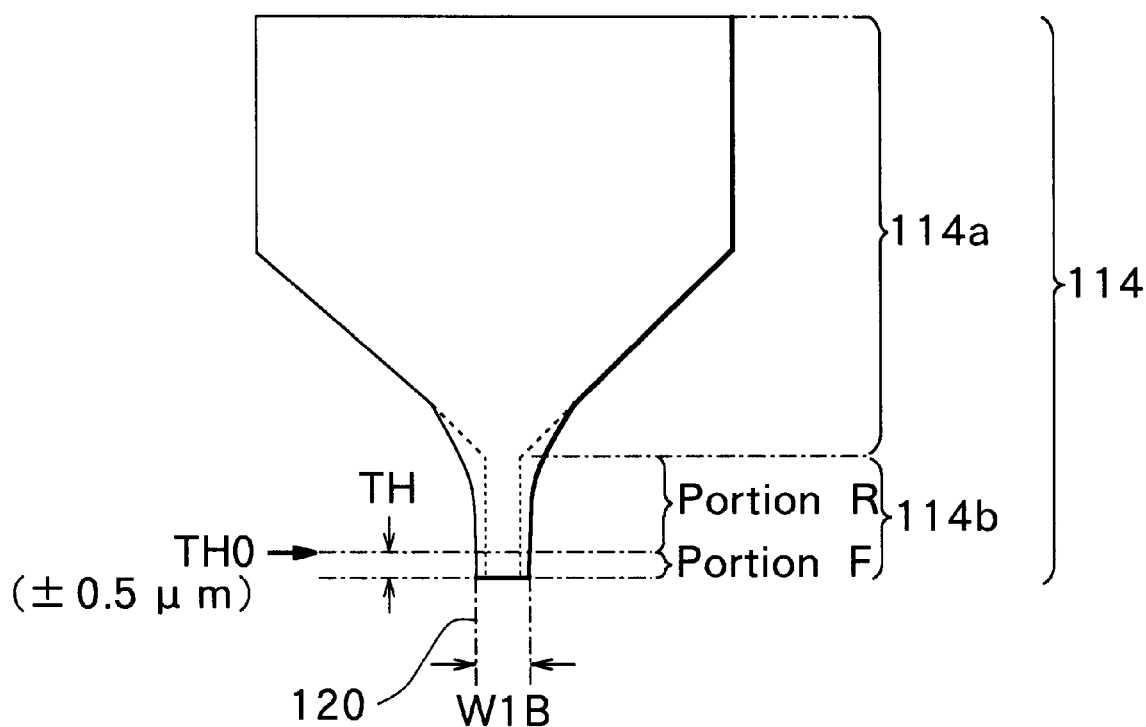
FIG. 44 is a plan view of the top pole for describing the problem of the scale-down of the top pole of the conventional thin film magnetic head.

As can be seen from FIG. 7A, the end portion 17c extends on the flat write gap layer 9, and the intermediate portion 17b and the yoke portion 17a extend on an apex portion which comprises the photoresist layers 11 and 13 or the like and rises like a hill. The width W2 of the end portion 17c corresponds to a pole width P2W (FIG. 40) and defines a track width on a recording medium.

Next, a characteristic function of the method of manufacturing the thin film magnetic head according to this embodiment will be described with reference to FIGS. 10A to 13.

Figure 10A:
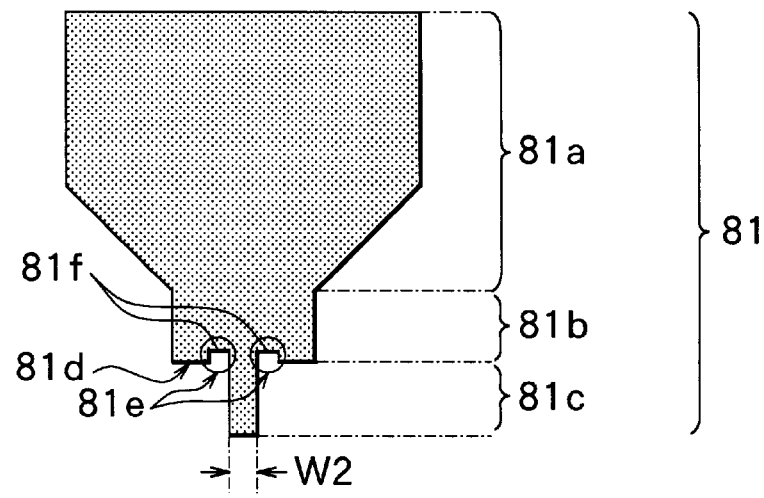
FIGS. 10A to 10C are plan views of a relationship between a plan shape of a photomask for use in the first embodiment and the respective plan shapes of a photoresist pattern and the top pole.
Figure 10B:
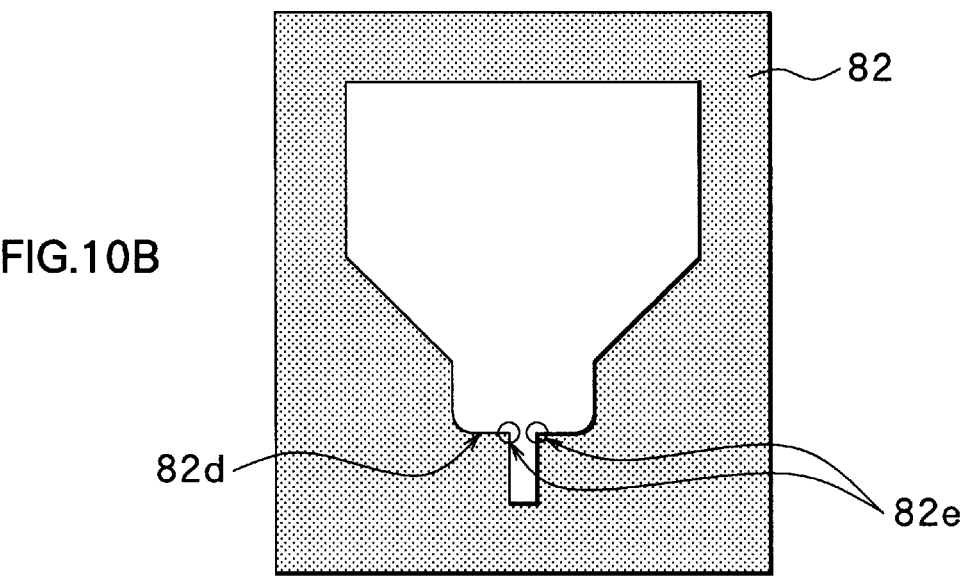
Figure 10C:
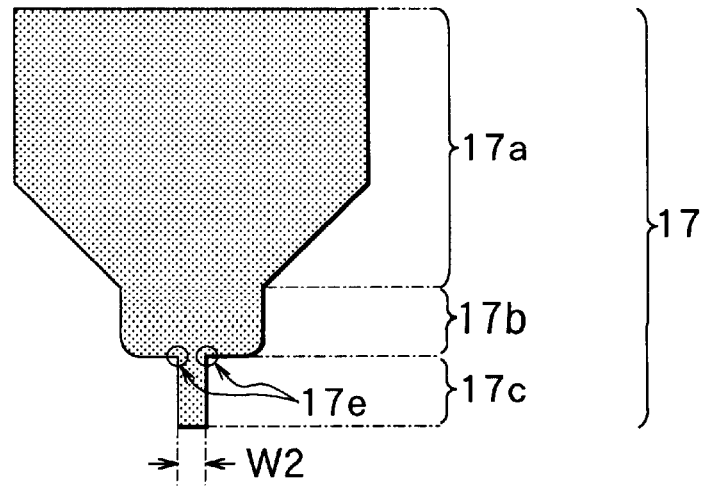
Figure 11A:
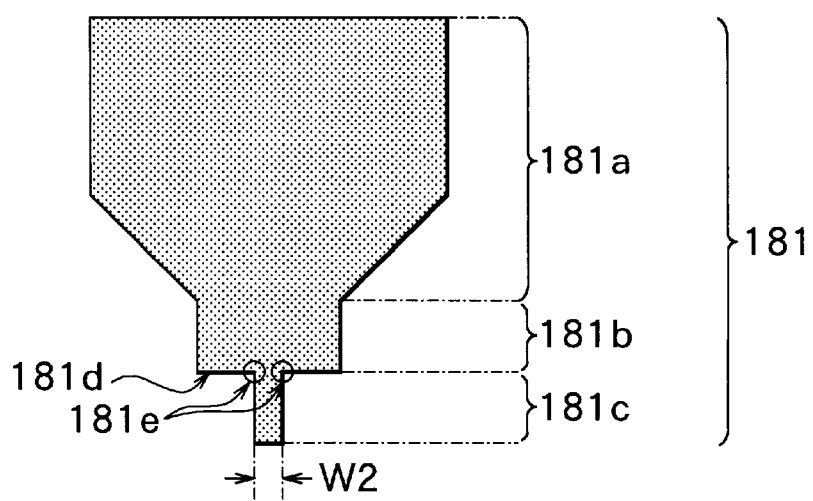
FIGS. 11A to 11C are plan views of the relationship between the plan shape of the photomask for use in a comparison to the first embodiment and the respective plan shapes of the photoresist pattern and the top pole.
Figure 11B:
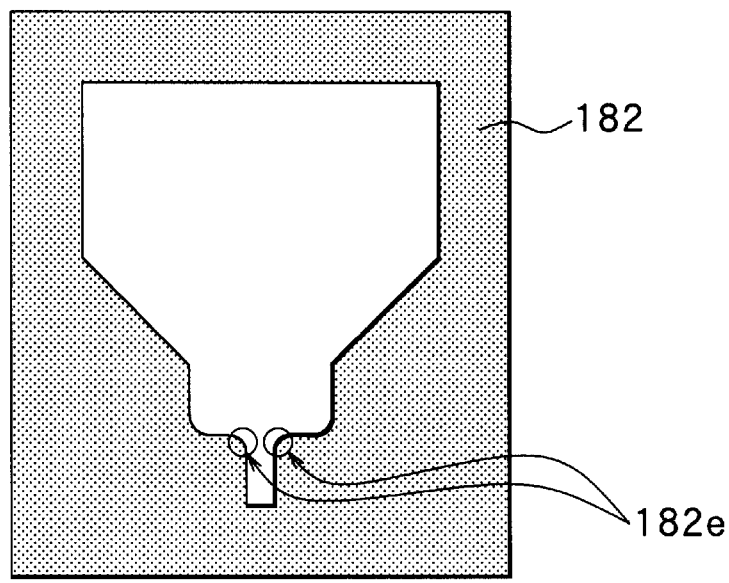
Figure 11C:
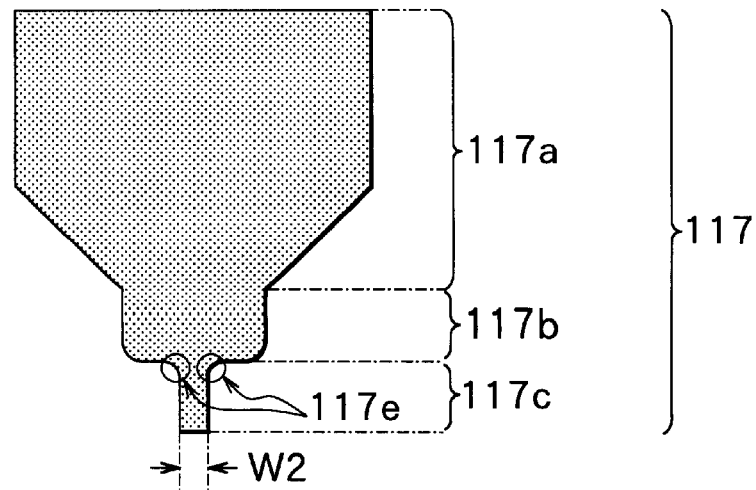

FIGS. 10A to 10C show plan shapes of the photomask 81, the photoresist pattern 82 and the top pole 17, respectively. FIGS. 11A to 11C show the plan shapes of a photomask 181, a photoresist pattern 182 and a top pole 117, respectively, as a comparison to this embodiment.

As shown in FIG. 10A, the photomask 81 basically has the same pattern shape as the shape of the top pole 17 to be obtained. The photomask 81 has a reversal pattern of the photoresist pattern 82. The photomask 81 includes a portion 81a corresponding to the yoke portion 17a of the top pole 17, a portion 81b corresponding to the intermediate portion 17b, and a portion 81c corresponding to the end portion 17c.

A step 81d along the width at the boundary between the portion 81b and the portion 81c corresponds to the step along the width at the coupling portion between the intermediate portion 17b and the end portion 17c of the top pole 17 in FIG. 10C. The portion 81b of the photomask 81 has a concave pattern 81f at a corner 81e of the step 81d. In this embodiment, the concave pattern 81f has the shape that forms a part of a rectangle.

On the other hand, the photomask 181 as the comparison shown in FIG. 11A does not have the above-mentioned concave pattern 81f at a corner 181e of a step 181d. Thus, even if the corner 181e of the photomask 181 has a sharp right-angled edge, a corner 182e of the photoresist pattern 182 formed by the exposure, corresponding to the above-mentioned corner 181e is round in shape as shown in FIG. 11B. This is caused for the following reason. During the exposure, the reflected light from an underlying layer is diffracted and reaches under a shoulder of the step 181d, and thus the edge of the photoresist pattern is exposed to this light. As a result, the shape of this shoulder is deformed. Therefore, also in the top pole 117 finally obtained, a corner 117e of the step at the coupling portion between an intermediate portion 117b and an end portion 117c is round in shape. Consequently, an intended sharp right-angled corner edge cannot be obtained.

On the other hand, in this embodiment, as shown in FIG. 10A, the portion 81b of the photomask 81 has the concave pattern 81f at the corner 81e of the step 81d. Because of the presence of the concave pattern 81f, a corner 82e of the obtained photoresist pattern 82 corresponding to the above-mentioned corner 81e does not have a round shape but has the sharp right-angled edge. During the exposure, the reflected light from the underlying layer is diffracted and reaches under the shoulder of the step 81d, thus the edge of the photoresist pattern is exposed to the light, and thus the light acts on the shoulder so as to deform the shape of the shoulder. However, even under such an action, a protruding portion alone of the shoulder is deformed and only shifted backward, and therefore this action has little effect on the corner 81e. In this case, the position of a step 82d of the photoresist pattern 82 after the exposure is shifted backward from the position of the step 81d of the photomask 81 by an amount substantially equivalent to a depth of the concave pattern 81f. However, the photomask 81 can be positioned with allowance previously made for this amount. Thus, the corner 82e of the photoresist pattern 82 does not have the round shape but has the sharp right-angled edge. Therefore, a corner 17e of the step at the coupling portion between the intermediate portion 17b and the end portion 17c of the finally obtained top pole 17 also has the sharp right-angled corner edge.

Figure 12:
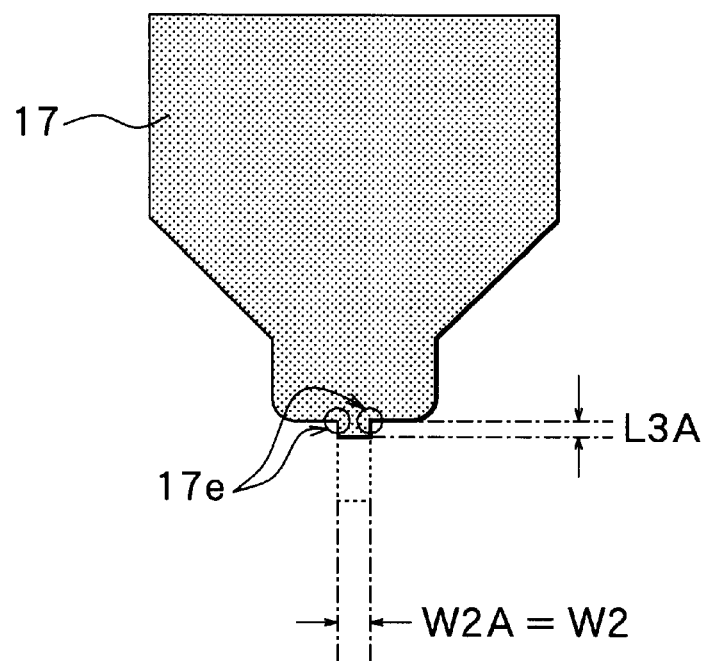
FIG. 12 is a plan view of the plan shape of the top pole formed by the method of manufacturing the thin film magnetic head according to the first embodiment.
Figure 13:
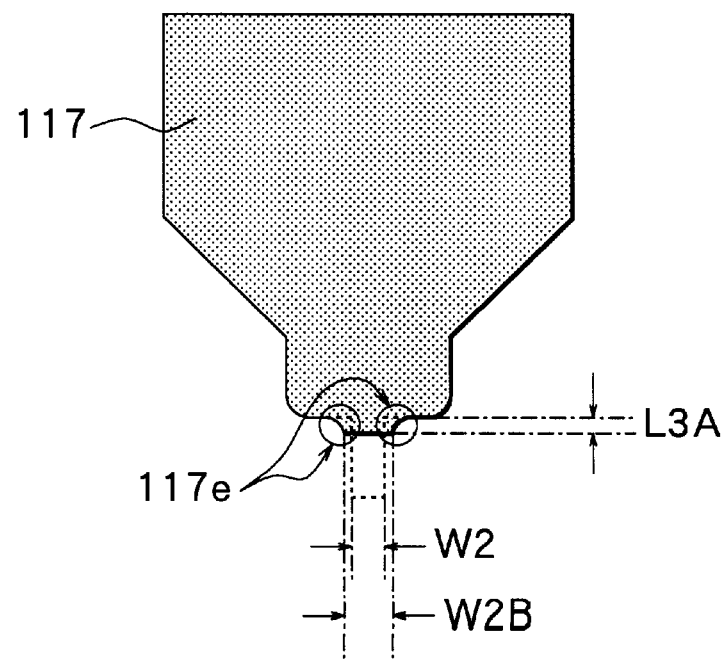
FIG. 13 is a plan view of the plan shape of the top pole formed by the method of manufacturing the thin film magnetic head according to the comparison.

FIGS. 12 and 13 show a comparison between the thin film magnetic head obtained by the method of manufacturing the thin film magnetic head according to this embodiment and the thin film magnetic head obtained by the method of manufacturing the thin film magnetic head according to the comparison. In more detail, FIG. 12 shows the final plan shape of the top pole 17 obtained by using the photomask 81 shown in FIG. 10A. FIG. 13 shows the final plan shape of the top pole 117 obtained by using the photomask 181 shown in FIG. 11A.

As mentioned in Description of the Related Art, an improvement in NLTS properties requires a sufficient reduction in the throat height TH. For example, as shown in FIG. 13, when an amount of polishing of the air bearing surface is larger than the amount of polishing of FIG. 11C shown as the comparison so that the throat height TH has a sufficiently small value L3A (e.g., about 0.4 μm), a width (pole width) W2B of the end portion 117c for delimiting a write track width is larger than the intended width W2 (the width of the photomask 181) due to an influence of the round shape of the corner 117e as shown in the drawing. Thus, it is difficult to reduce the write track width. Moreover, when an attempt to change the throat height TH is made, the obtained pole width is also changed due to the influence of the round shape of the corner. Accordingly, a stable write track width cannot be obtained.

On the other hand, in this embodiment, as shown in FIG. 12, even if the throat height TH has the sufficiently small value L3A, the width (pole width) of the end portion 17c for delimiting the write track width is substantially equal to the intended width W2 (the width of the photomask 181) and is substantially fixed regardless of the position of the end portion 17c along the extending direction, because the corner 17e is not round. Thus, the write track width can be reduced. Moreover, even if the throat height TH is changed, the write track width is not changed. Therefore, the stable write track width can be obtained.

Figures 14A, 14B:
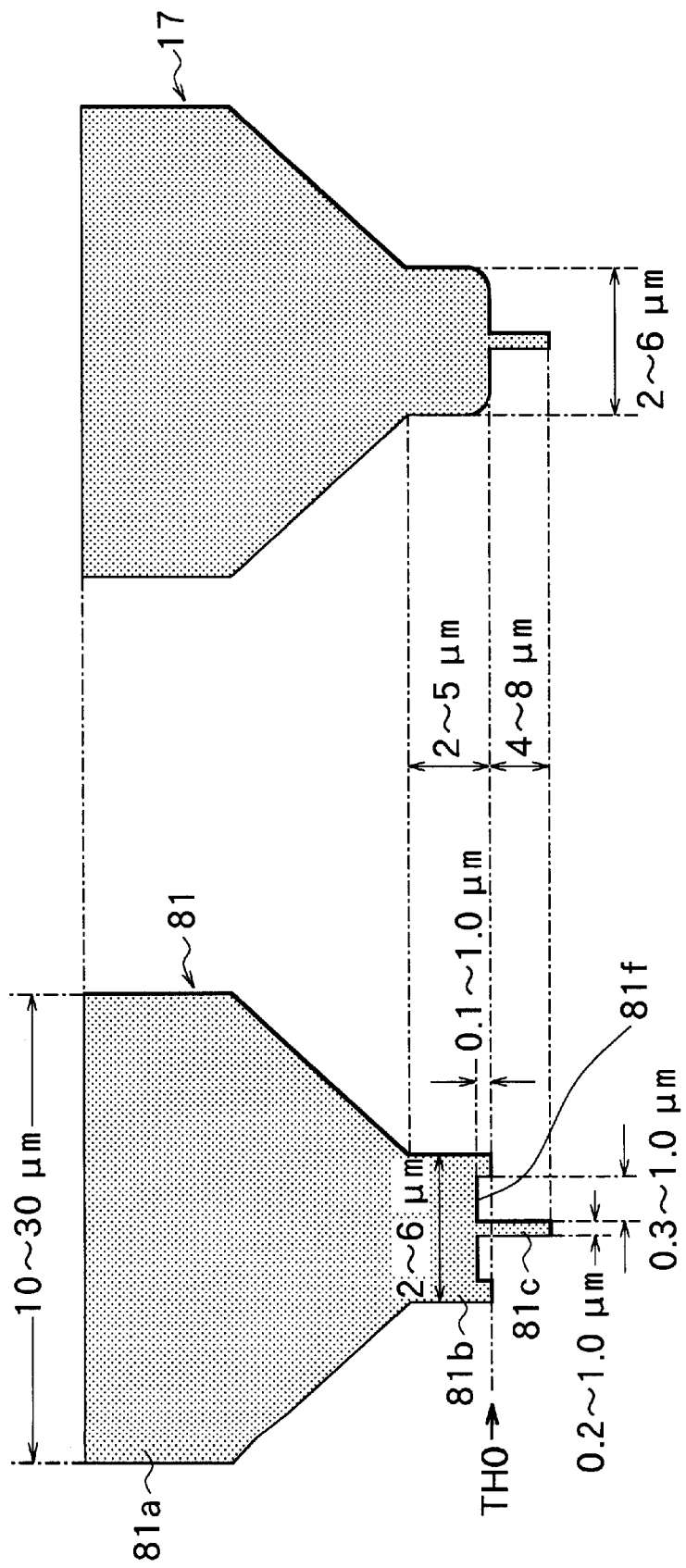
FIGS. 14A and 14B are plan views of an example of preferred dimensions of the photomask for use in the method of manufacturing the thin film magnetic head according to the first embodiment.

FIGS. 14A and 14B show one example of dimensions of the photomask 81 for use in this embodiment, in conjunction with the obtained top pole 17. In the example shown in this drawing, the concave pattern 81f forms a part of a rectangular shape having a vertical dimension of 0.1 μm to 1.0 μm and a horizontal dimension of 0.3 μm to 1.0 μm. More preferably, the vertical dimension is 0.1 μm to 0.7 μm. The horizontal dimension may be increased to about 0.5 μm to 2.5 μm. A vertical direction means the direction in which the portion 81c corresponding to the end portion 17c extends. A horizontal direction means the direction perpendicular to the direction in which the end portion 17c extends.

The end portion 17c is about 0.3 μm to 1.0 μm wide and about 4.0 μm to 8.0 μm long. The intermediate portion 17b is about 2.0 μm to 6.0 μm wide and about 2.0 μm to 5.0 μm long. The width of the yoke portion 17a is about 10 μm to 30 μm.

Figures 45A, 45B:
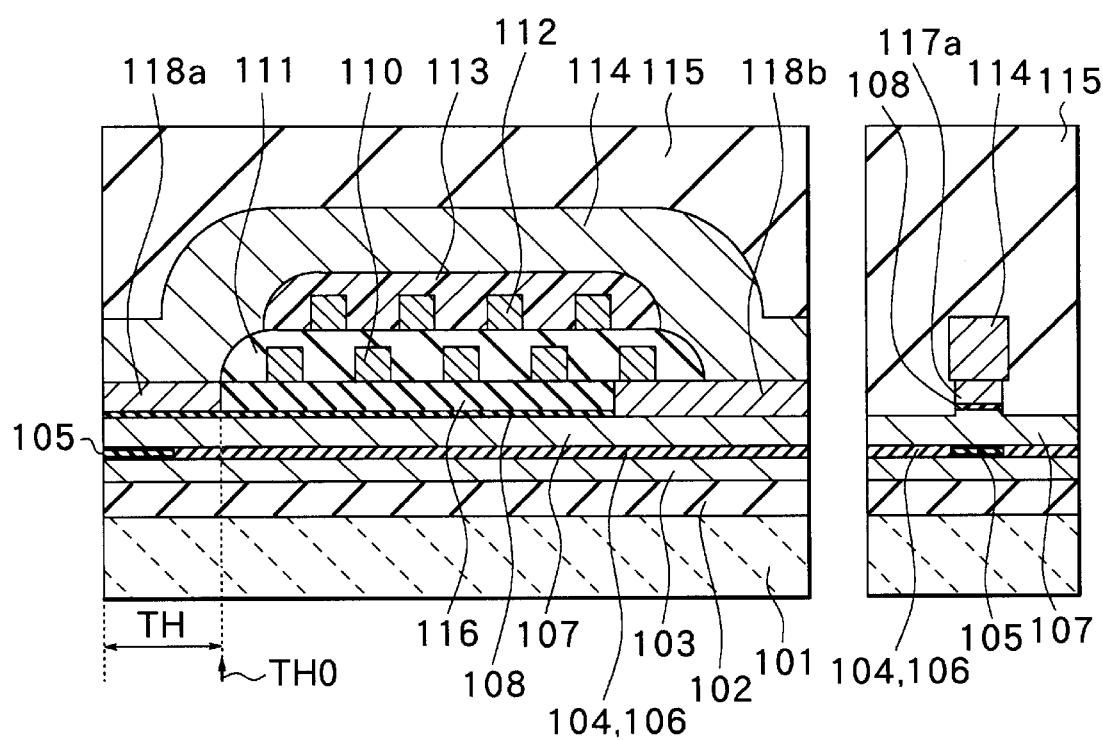
FIGS. 45A and 45B are cross sectional views of the structure of the top pole of another thin film magnetic head manufactured by the conventional method of manufacturing the thin film magnetic head.

The thin film magnetic head having the top pole 17 having such a shape delivers high performance in overwrite properties. That is, as shown in FIG. 9, in the top pole 17, the intermediate portion 17b coupled to the end portion 17c at the TH0 position has the width W1, which is still larger than the width W2 of the end portion 17c for defining the track width on the recording medium. A volume of the intermediate portion 17b is larger than the volume of a portion R of the prior art (FIGS. 45A and 45B). Thus, a magnetic flux generated in the yoke portion 17a by the thin film coils 10 and 12 is not saturated in the intermediate portion 17b, and the magnetic flux sufficiently reaches to the end portion 17c. Therefore, even if the end portion 17c corresponds to a narrow write track width of, for example, the submicron order, an enough magnetic flux for overwrite is obtained. In other words, sufficient overwrite properties can be ensured while the write track width is reduced.

Figure 15:
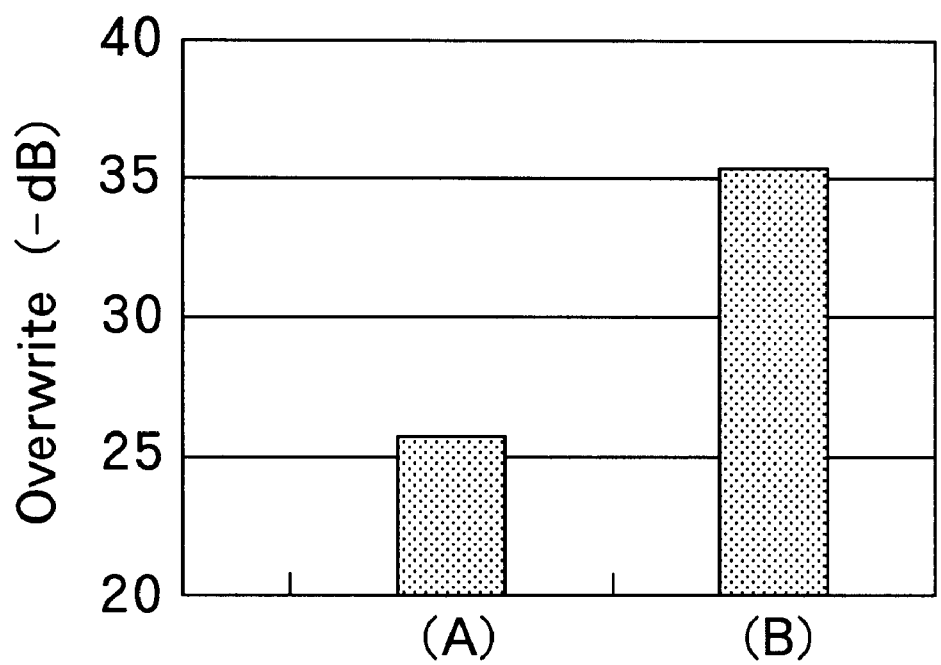
FIG. 15 is a graph of a comparison between overwrite properties of the thin film magnetic head obtained by the method of manufacturing the thin film magnetic head according to the first embodiment and overwrite properties of the thin film magnetic head obtained by a conventional method of manufacturing the thin film magnetic head.

FIG. 15 shows the comparison between the overwrite properties of the thin film magnetic head manufactured by the conventional manufacturing method and the overwrite properties of the thin film magnetic head manufactured by the manufacturing method of this embodiment. (A) in this drawing shows the overwrite properties of the conventional thin film magnetic head having a top pole 114 having the shape shown in FIGS. 45A and 45B. (B) in this drawing shows the overwrite properties of the thin film magnetic head having the top pole 17 having the shape shown in FIG. 9. As shown in FIG. 15, the thin film magnetic head manufactured by the conventional manufacturing method has the overwrite properties of 26.0 dB, while the thin film magnetic head manufactured by the manufacturing method of this embodiment has the overwrite properties that is as high as 35.5 dB. That is, the overwrite properties is improved.

As described above, according to the method of manufacturing the thin film magnetic head according to this embodiment, the photoresist pattern functioning as the mask for forming the top pole 17 is formed by use of a negative photoresist, and the concave pattern 81f is formed at the corner 81e of the step 81d of the photomask 81 along the width during the formation of the photoresist pattern. Thus, the corner at the coupling portion between the intermediate portion 17b and the end portion 17c of the top pole 17 can be formed into the sharp edge. Thus, even if the throat height TH is changed, the write track width is not changed and thus the stable write track width can be obtained. Moreover, the write track width can be reduced. Therefore, an occurrence of a sidelight phenomenon can be effectively prevented.

Moreover, according to this embodiment, the width of the intermediate portion 17b is sufficiently larger than the width of the end portion 17c, and thus a magnetic volume can be sufficiently ensured immediately at the rear of the coupling portion. Thus, the magnetic flux generated in the yoke portion 17a is prevented from being saturated before reaching to the end portion 17c. The sufficient overwrite properties can be therefore ensured.

Moreover, in this embodiment, the insulating layer 8 for defining the throat height TH is formed of the inorganic insulating film. Thus, the heat treatment at a temperature of about 250° C. for forming the coils 10 and 12 does not cause a shift (pattern shift) of the edge of the insulating layer 8 and a profile deterioration. Thus, the throat height can be precisely controlled. Furthermore, an MR height can be precisely controlled, and an apex angle θ can be precisely controlled.

Moreover, in this embodiment, the insulating layer 8 for defining the throat height is formed of the inorganic insulating film. Thus, the insulating layer 8 is not shifted when the write gap layer 9 and the bottom pole 7 are etched in order to form the trim structure. This enables the throat height to be precisely controlled.

Moreover, according to this embodiment, the thick insulating layer 8, as well as the thin write gap layer 9, is formed between the bottom pole (upper shield) 7 and the thin film coils 10 and 12. Thus, a high withstand voltage can be obtained between the bottom pole (upper shield) 7 and the thin film coils 10 and 12, and a leakage of the magnetic flux from the thin film coils 10 and 12 can be reduced.

In this embodiment, for example, NiFe or iron nitride (FeN) is used as the top pole 17. However, besides these materials, the material having the high saturation magnetic flux density, such as an amorphous material of Fe—Co—Zr, may be used as the top pole 17, or a lamination of two or more of these materials may be used as the top pole 17. Moreover, the magnetic material comprising the lamination of NiFe and the above-mentioned material having the high saturation magnetic flux density may be used as the bottom pole 7.

Moreover, the photomask 81 is not limited to the shape shown in FIG. 10A and may have the shapes shown in FIGS. 16 to 19, for example. These drawings are enlarged views of the intermediate portion and the end portion of the top pole, and most of the yoke portion is not shown in these drawings.

Figure 16:
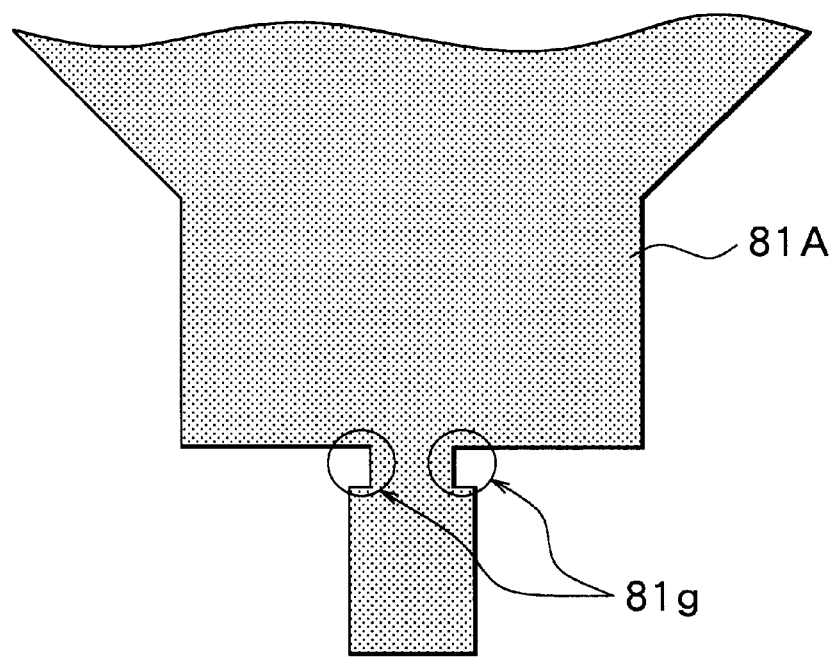
FIG. 16 is a plan view of the plan shape of a principal part of the photomask according to one alternative to the first embodiment.
Figure 17:
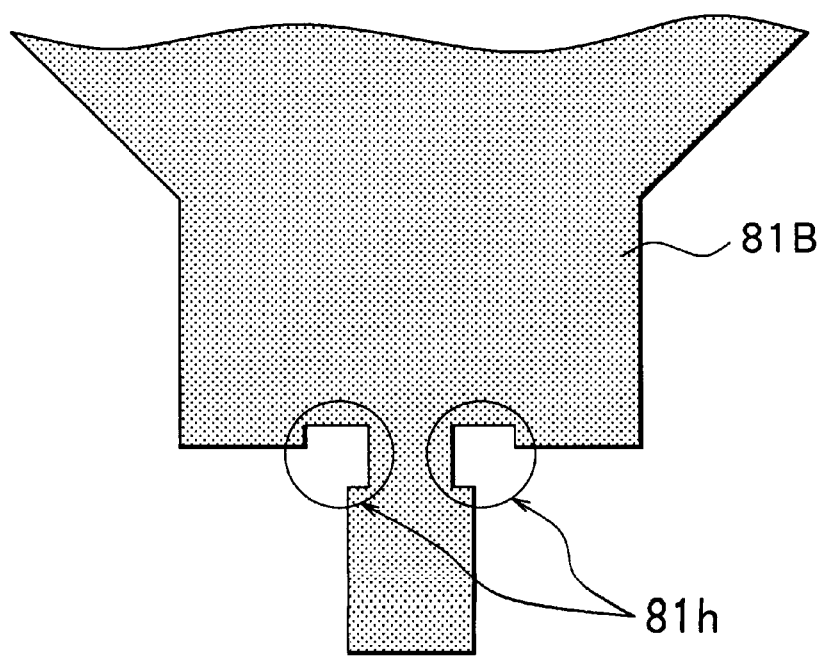
FIG. 17 is a plan view of the plan shape of the principal part of the photomask according to another alternative to the first embodiment.
Figure 18:
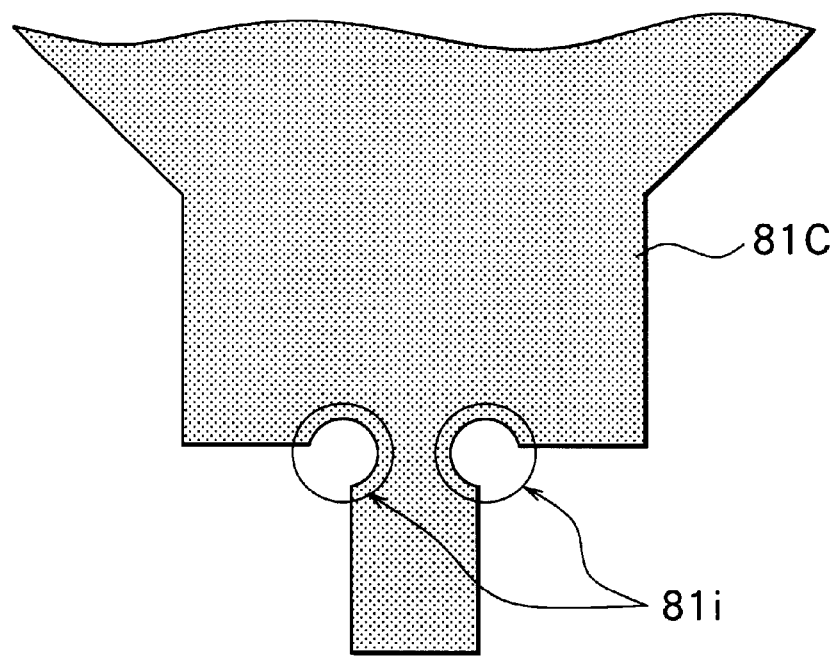
FIG. 18 is a plan view of the plan shape of the principal part of the photomask according to still another alternative to the first embodiment.
Figure 19:
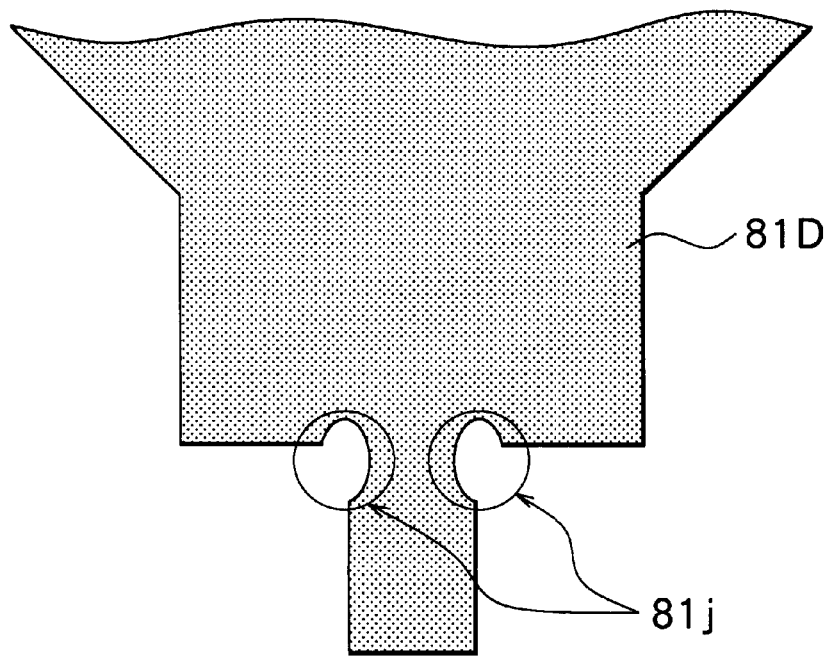
FIG. 19 is a plan view of the plan shape of the principal part of the photomask according to a further alternative to the first embodiment.

FIG. 16 shows the example in which a concave pattern 81g forming a part of the rectangle is formed not in the intermediate portion 17b but in the end portion 17c at the corner of a photomask 81A. FIG. 17 shows the example in which a concave pattern 81h forming a part of the rectangle is formed from the intermediate portion 17b to the end portion 17c at the corner of a photomask 81B. FIG. 18 shows the example in which a concave pattern 81i forming a part of a circle, not the rectangle, is formed from the intermediate portion 17b to the end portion 17c at the corner of a photomask 81C. FIG. 19 shows the example in which a concave pattern 81j forming a part of an ellipse is formed from the intermediate portion 17b to the end portion 17c at the corner of a photomask 81C.

Also when the photomasks 81A to 81D shown in FIGS. 16 to 19 are used, the same effect as the effect obtained by using the photomask 81 shown in FIG. 10A can be basically obtained.

[Second Embodiment]

Next, a second embodiment of the invention will be described.

Figure 20A:
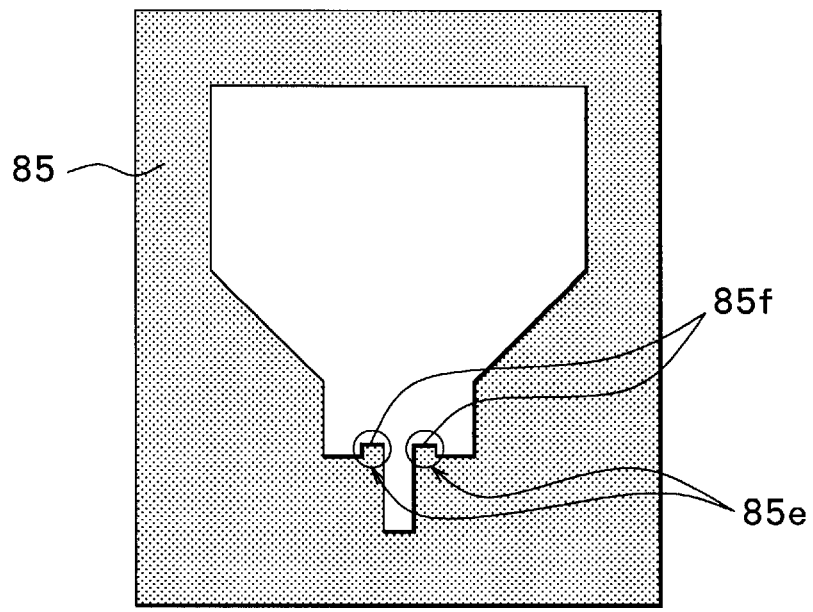
FIGS. 20A to 20C are plan views of the relationship between the plan shape of the photomask for use in a second embodiment of the invention and the respective plan shapes of the photoresist pattern and the top pole.
Figure 20B:
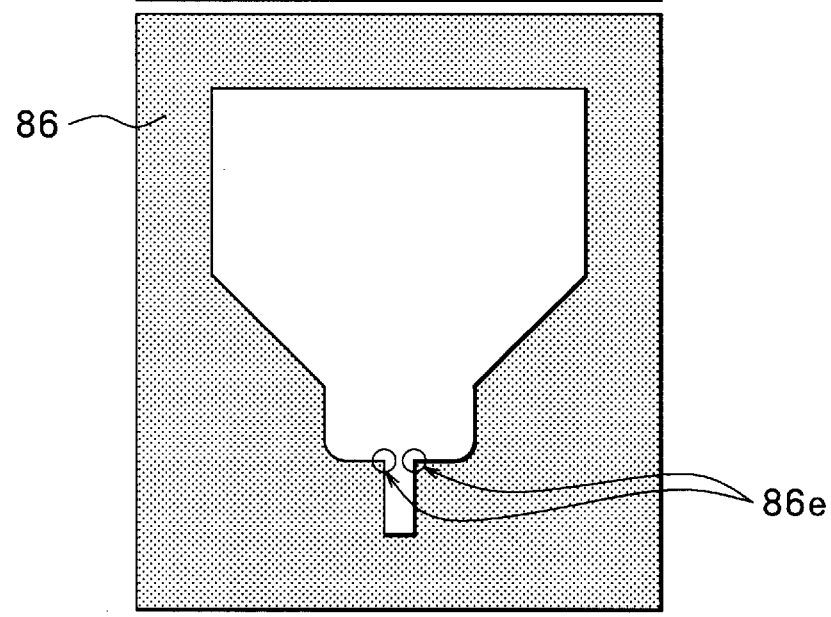
Figure 20C:
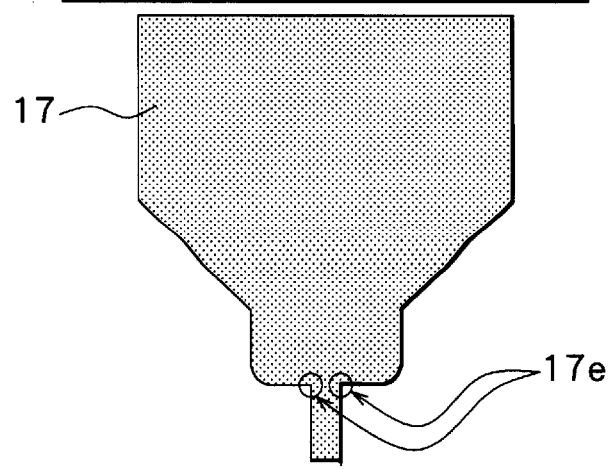

FIGS. 20A to 20C show the respective shapes of the photomask for use in this embodiment, the obtained photoresist pattern and the obtained top pole. FIG. 20A shows the plan shape of a photomask 85. FIG. 20B shows the plan shape of a photoresist pattern 86 formed by using the photomask 85. FIG. 20C shows the plan shape of the top pole 17 formed by using the photoresist pattern 86.

Differently from the above-described embodiment, the method of manufacturing the thin film magnetic head according to this embodiment is applied to the formation of the photoresist pattern using a positive photoresist, i.e., the photoresist, only an unexposed region of which remains after the development. In this case, as shown in FIGS. 20A and 20B, the photomask having the reversal shape pattern of the top pole 17 to be obtained is basically used as the photomask 85. In other words, the photomask 85 has the same shape pattern as the photoresist pattern 86 has. However, the photomask 85 has a convex pattern 85f at its corner 85e. In this embodiment, the convex pattern 85f has the shape forming a part of the rectangle.

Figures 21A, 21B, 21C:
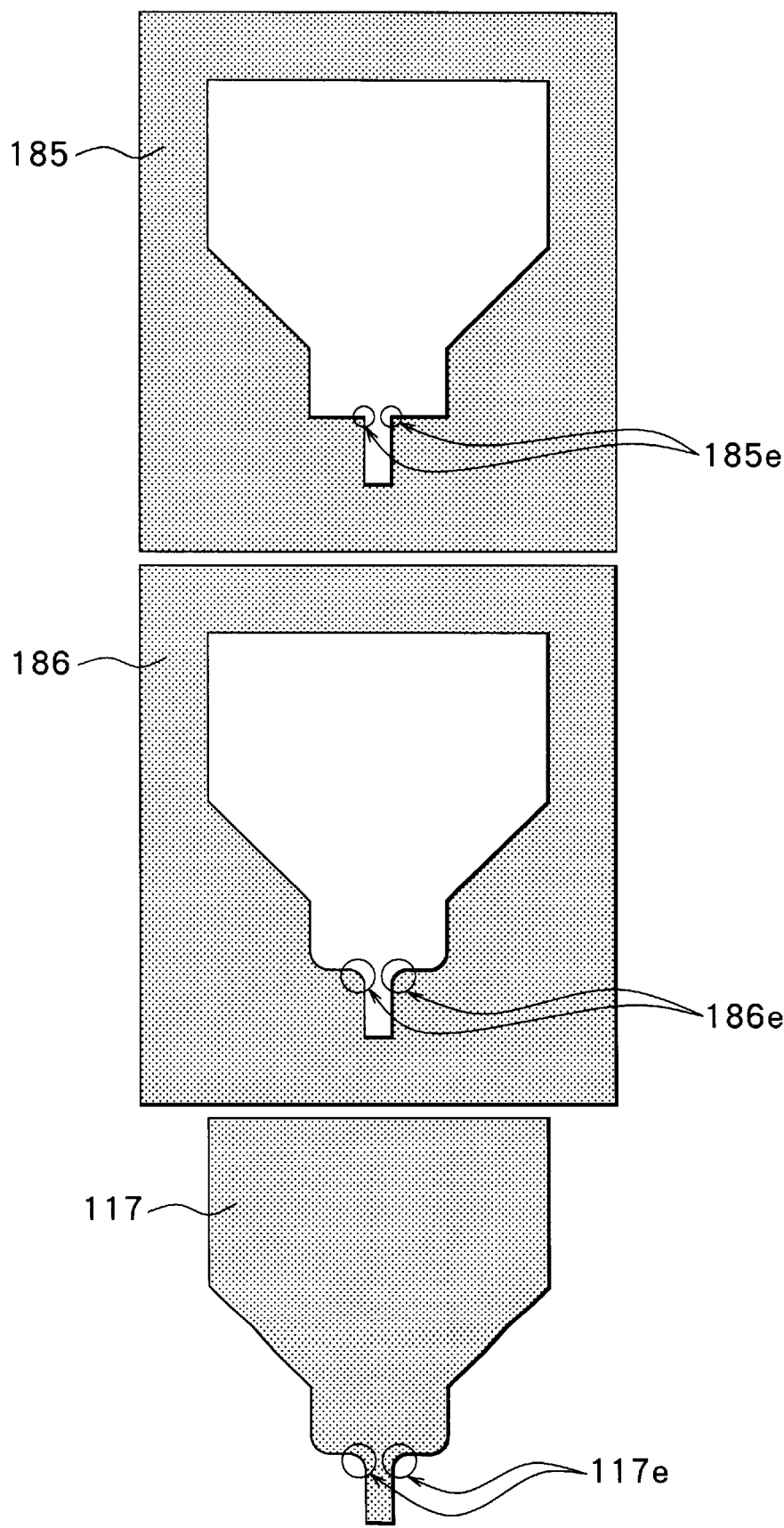
FIGS. 21A to 21C are plan views of the relationship between the plan shape of the photomask for use in the comparison with the second embodiment of the invention and the respective plan shapes of the photoresist pattern and the top pole.

The photolithography process is performed by use of the photomask 85 having such a convex pattern 85f at the corner thereof. Thus, it is possible to prevent the corner 85e from being excessively exposed to the reflected light from an underlying reflecting layer, particularly, the light reflected obliquely or transversely from the apex portion, or the like. Thus, as shown in FIG. 20B, the photoresist pattern 86 having a corner 86e having the sharp edge can be obtained. The edge of the corner 17e of the finally obtained top pole 17 also becomes sharp as shown in FIG. 20C. FIGS. 21A to 21C show the comparison with this embodiment. FIG. 21A shows the plan shape of a photomask 185. FIG. 21B shows the plan shape of a photoresist pattern 186 formed by using the photomask 185. FIG. 21C shows the plan shape of the top pole 117 formed by using the photoresist pattern 186. As shown in these drawings, in this comparison, the photomask 185 does not have the above-mentioned convex pattern 85f at a corner 185e. Thus, even if the corner 185e of the photomask 185 has the sharp right-angled edge as shown in FIG. 21A, a corner 186e of the photoresist pattern 186 formed by the exposure, corresponding to the above-mentioned corner 185e is round in shape as shown in FIG. 21B. Therefore, the corner 117e of the top pole 117 finally obtained is also round in shape. Consequently, the intended sharp right-angled corner edge cannot be obtained.

Since other processes, functions and effects of the method of manufacturing the thin film magnetic head according to this embodiment are the same as those of the above-described first embodiment, the description is omitted.

According to the method of manufacturing the thin film magnetic head according to this embodiment, the photoresist pattern functioning as the mask for forming the top pole 17 is formed by use of the positive photoresist, and the convex pattern 85f acting so as to reduce an excessive exposure caused by the influence of the reflected light from the underlying layer is formed at the corner 85e of the photomask 85 during the formation of the photoresist pattern. Thus, the corner at the coupling portion between the intermediate portion 17b and the end portion 17c of the top pole 17 can be sharply formed. Thus, even if the throat height TH is changed, the write track width is not changed and thus the stable write track width can be obtained. Moreover, the write track width can be narrowed.

[Third Embodiment]

Next, the method of manufacturing the thin film magnetic head according to a third embodiment of the invention will be described.

In this embodiment, the processes before the formation of the top pole 17 are the same as those of the above-described first embodiment, and thus the description is omitted.

Figures 22A, 22B:
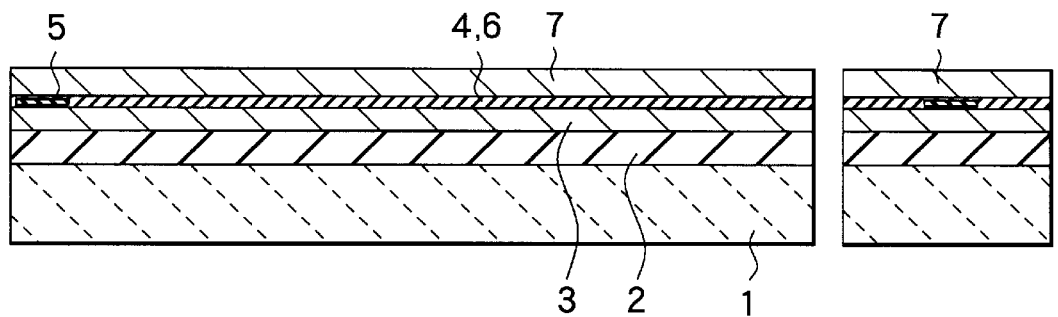
FIGS. 22A and 22B are cross sectional views for describing one process of the method of manufacturing the thin film magnetic head according to a third embodiment of the invention.
Figures 23A, 23B:
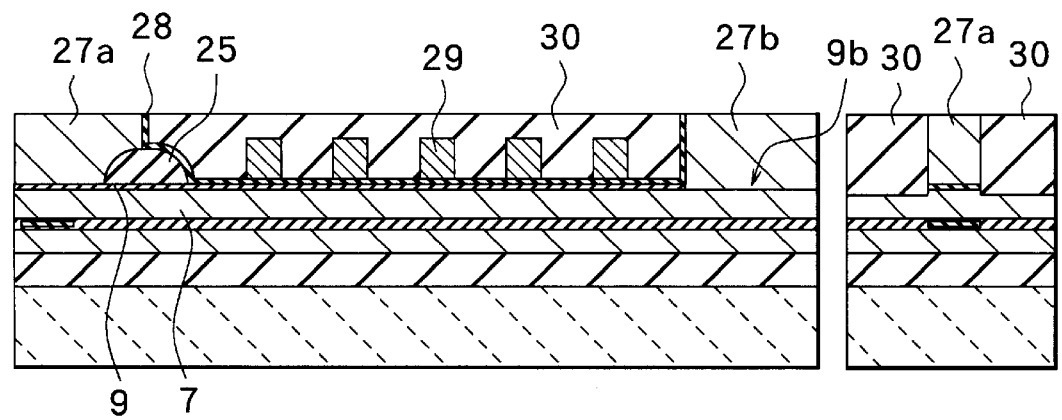
FIGS. 23A and 23B are cross sectional views for describing the process following the process of FIGS. 22A and 22B.

In this embodiment, the formation of the bottom pole 7 is finished as shown in FIGS. 22A and 22B, then, as shown in FIGS. 23A and 23B, the write gap layer 9 is formed and an insulating film pattern 25 for defining the throat height TH is formed on the write gap layer 9. Then, the write gap layer 9 is partially etched at the rear of the region in which thin film coils 29 are to be formed by the following process (on the right side in FIG. 23A) in order to form the magnetic path, whereby an opening 9b is formed. Then, a top pole chip 27a for constituting a part of the top pole is selectively formed by, for example, the electroplating in the region from the insulating film pattern 25 to the portion to be a track-facing surface (the air bearing surface). At the same time, a pattern 27b for forming the magnetic path is formed also in the opening 9b. The material having the high saturation magnetic flux density, such as a permalloy (NiFe) alloy or an iron nitride (FeN) alloy, is used as the top pole chip 27a and the pattern 27b for forming the magnetic path.

The top pole chip 27a and the pattern 27b for forming the magnetic path are formed in the following manner, for example. That is, first, the NiFe alloy, the material having the high saturation magnetic flux density is formed with a thickness of about 70 nm by the sputtering, for example, and the electrode film (not shown) to be used as the seed layer for the electroplating is formed. Then, the above-mentioned electrode film is coated with the photoresist, the photoresist is patterned by the photolithography, and the photoresist pattern (not shown) is formed by the frame plating. Then, the top pole chip 27a and the pattern 27b for forming the magnetic path are formed with a thickness of about 3 $\mu$m to 5 $\mu$m by the electroplating using the photoresist pattern as the mask and using the previously formed electrode film as the seed layer. Then, the photoresist pattern is removed. The top pole chip 27a has the plan shape shown in FIG. 27C, for example. The shape of the top pole chip 27a will be described below.

Then, the write gap layer 9 and the bottom pole 7 are etched by about 0.3 $\mu$m to 0.5 $\mu$m by means of, for example, the ion milling using the top pole chip 27a as the mask, whereby the trim structure for preventing an increase in an effective track width during writing is formed.

Then, an insulating film 28 such as the alumina film, for example, is formed over the whole surface with a film thickness of about 0.5 $\mu$m to 1.5 $\mu$m. Then, the thin film coils 29 made of copper (Cu), for example, for the inductive recording head are formed with a thickness of 2 $\mu$m to 3 $\mu$m by the electroplating, for example. Then, an insulating film 30 such as the alumina film, for example, is formed over the whole surface with a film thickness of about 3 $\mu$m to 4 $\mu$m. Then, the whole surface is polished and flattened by CMP (Chemical Mechanical Polishing) method, for example, whereby the surfaces of the top pole chip 27a and the pattern 27b for forming the magnetic path are exposed.

Then, as shown in FIGS. 24A and 24B, an upper yoke-cum-top pole (hereinafter referred to as a top pole) 27c is formed with a thickness of about 3 $\mu$m to 5 $\mu$m by the electroplating in the same manner as the process of the top pole chip 27a and the pattern 27b for forming the magnetic path. The top pole 27c has the shape shown in FIG. 26, for instance. The top pole 27c is in contact with and magnetically coupled to the bottom pole 7 in the above-mentioned opening 9a and is also in contact with and magnetically coupled to the top pole chip 27a. For example, the high-saturation magnetic material such as permalloy (NiFe) or iron nitride (FeN) is used as the top pole 27c. The top pole 27c corresponds to "the third magnetic layer portion" of the invention.

Then, as shown in FIGS. 25A and 25B, an overcoat layer 38 made of alumina, for example, is formed so that the whole surface may be coated with the overcoat layer 38. Finally, the slider is machined, whereby the air bearing surface (track surface) of the recording head and the reproducing head is formed. As a result, the thin film magnetic head is completed.

In this embodiment, only the single-layer thin film coils 29 are formed. However, the following structure may be formed. That is, as shown in FIG. 25A, second-layer thin film coils 35 are formed on the insulating film 30 coating the thin film coils 29, then the thin film coils 35 are coated with a photoresist layer 36, and then a top pole 37 is selectively formed on the photoresist layer 36.

Figure 26:
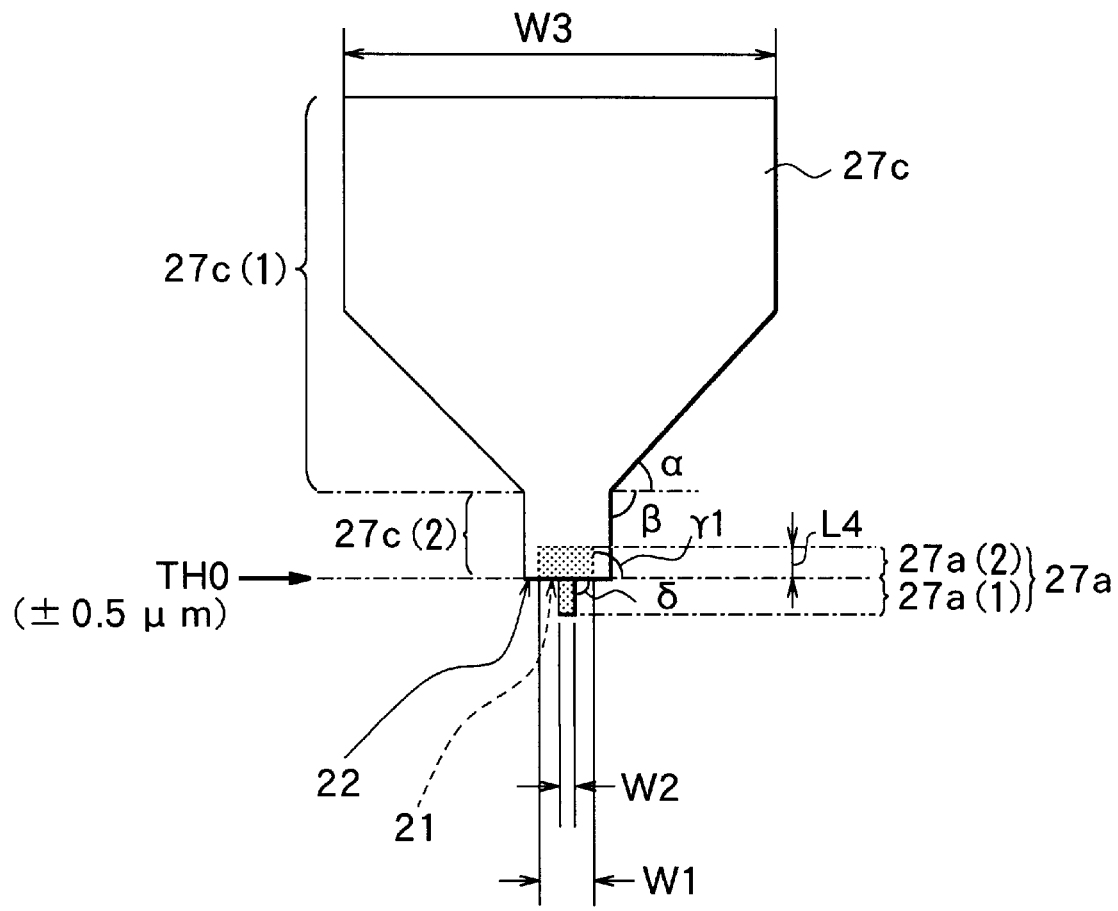
FIG. 26 is a plan view of the plan structure of the top pole and a top pole chip of the thin film magnetic head manufactured by the method of manufacturing the thin film magnetic head according to the third embodiment.

FIG. 26 shows the plan structure of the top pole 27c and the top pole chip 27a. As shown in this drawing, the top pole 27c has a yoke portion 27c(1) having the width W3 and occupying most of the top pole 27c, and a connection portion 27c(2) partially overlapping and connected to the top pole chip 27a. The shape of the yoke portion 27c(1) is the same as the shape of the yoke portion 17a of the top pole 17 of the above-described first embodiment. The width of the connection portion 27c(2) is wider than the width of the intermediate portion 17b of the top pole 17 of the above-described first embodiment. The centers of the yoke portion 17a and the connection portion 27c(2) along the width match each other.

On the other hand, the top pole chip 27a has an end portion 27a(1) for defining the write track width on the recording medium, and an intermediate portion 27a(2) connected to the connection portion 27c(2) of the top pole 27c. The intermediate portion 27a(2) has the same width W1 as the intermediate portion 17b of the top pole 17 of the above-described first embodiment has. The intermediate portion 27a(2) has a length L4. The end portion 27a(1) has the same width W2 as the end portion 17c of the above-described first embodiment has. The coupling portion between the end portion 27a(1) and the intermediate portion 27a(2) substantially matches the TH0 position and also matches a front edge surface of the connection portion 27c(2) of the top pole 27c (the edge surface close to the air bearing surface). At this coupling portion (i.e., substantially the TH0 position), the width of the intermediate portion 27a(2) is W1, and the width of the end portion 27a(1) is W2 that is smaller than W1. That is, the step along the width exists between the intermediate portion 27a(2) and the end portion 27a(1) at the TH0 position or near the TH0 position. The step surface 21 of this step portion close to the intermediate portion 27a(2) forms an angle $\gamma$1 with the side surface of the intermediate portion 27a(2). The step surface 21 forms the angle $\delta$ with the side edge surface of the end portion 27a(1). In this embodiment, both of the angles $\gamma$1 and $\delta$ are about 90 degrees. That is, both of the intermediate portion 27a(2) and the end portion 27a(1) form the rectangle, and the step surface 21 is substantially perpendicular to the side edge surface of the end portion 27a(1). The end portion 27a(1) corresponds to one specific example of "the first magnetic layer portion" of the invention. The intermediate portion 27a(2) corresponds to one specific example of "the second magnetic layer portion" of the invention. As is apparent from FIGS. 24A, 24B and 26, the end portion 27a(1) extends on the flat write gap layer 9, and the intermediate portion 27a(2) is located on the insulating film pattern 25.

Preferably, the dimensions of the portions shown in FIG. 26 have the following values, for instance.

The width W1 of the intermediate portion 27a(2) is equal to 2.0 $\mu$m to 5.0 $\mu$m.

The length L4 of the intermediate portion 27a(2) is equal to 1.0 $\mu$m to 5.0 $\mu$m.

The width W2 of the end portion 27a(1) is equal to 0.4 $\mu$m to 1.2 $\mu$m.

The width W3 of the yoke portion 17a is equal to 30 $\mu$m to 40 $\mu$m.

The length of the connection portion 27c(2) is equal to 3.0 μm to 5.0 μm.

FIGS. 27A to 27D show the top pole chip 27a, and the photomask and the photoresist pattern for use in the photolithography process for forming the top pole chip 27a. FIG. 27A shows the plan shape of a photomask 88. FIG. 27B shows the plan shape of a photoresist pattern 89. FIG. 27C shows the plan shape of the top pole chip 27a. FIG. 27D shows a state in which the top pole 27c partially overlaps the intermediate portion 27a(2) and extends on the intermediate portion 27a(2) of the top pole chip 27a.

As shown in FIG. 27A, the photomask 88 basically has the same pattern shape as the top pole chip 27a to be obtained has. In other words, the photomask 88 has the reversal shape pattern of the photoresist pattern 89. The photomask 88 includes a portion 88b corresponding to the intermediate portion 27a(2) of the top pole chip 27a, and a portion 88c corresponding to the end portion 27a(1). The portion 88b of the photomask 88 has a concave pattern 88f forming a part of the rectangle at a corner 88e.

When the photolithography is performed by using the photomask 88 having such a shape, the photoresist pattern 89 having a corner 89e having the sharp edge can be obtained as shown in FIG. 27B for the same reason as the above-described first embodiment. A plating process is performed by using such a photoresist pattern 89, whereby the top pole chip 27a having a corner 27ae with the sharp edge can be obtained as shown in FIG. 27C. Thus, similarly to the above-described embodiments, even if the throat height TH is changed, the write track width is not changed and thus the stable write track width can be obtained. Moreover, the write track width can be narrowed. Therefore, the occurrence of the sidelight phenomenon can be effectively prevented.

Moreover, the thin film magnetic head having the top pole 27c having such a shape can ensure the magnetic volume immediately at the rear of the coupling portion and thus ensure the sufficient overwrite properties.

Moreover, in this embodiment, the top pole 27c can be formed on the flat portion subjected to CMP, and therefore the photoresist pattern is easily formed with high accuracy by the photolithography.

Moreover, in this embodiment, the insulating film 28 made of alumina or the like is formed between the write gap layer 9 and the thin film coils 10. Thus, the withstand voltage between the thin film coils 10 and the bottom pole 7 can be increased, and the leakage of the magnetic flux from the thin film coils 10 can be reduced.

The position of a front edge surface 22 of the connection portion 27c(2) of the top pole 27c (close to the air bearing surface) does not have to exactly match the position of the step surface 21 of the top pole chip 27a matching the TH0 position. The position of the edge surface 22 of the connection portion 27c(2) may be shifted rearward (in the direction opposite to the air bearing surface) from the position of the step surface 21.

[Fourth Embodiment]

Next, a fourth embodiment of the invention will be described.

Figures 28A, 28B:
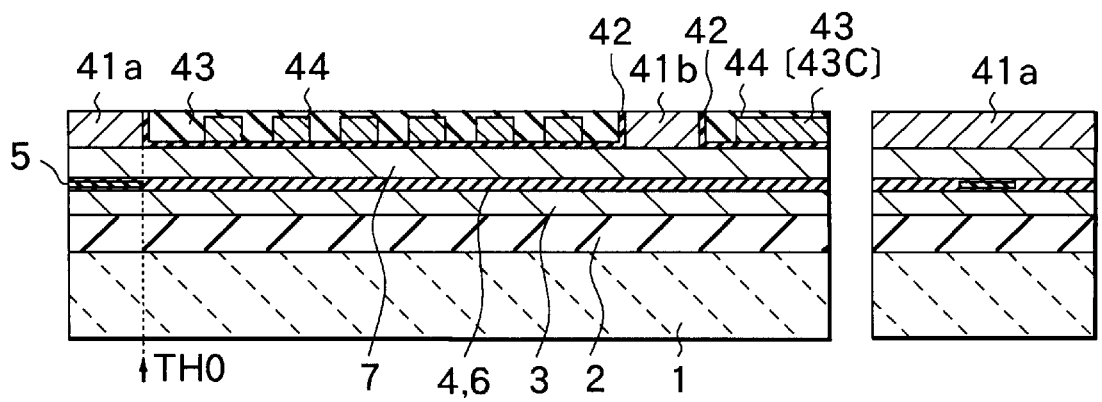
FIGS. 28A and 28B are cross sectional views for describing one process of the method of manufacturing the thin film magnetic head according to a fourth embodiment of the invention.
Figures 29A, 29B:
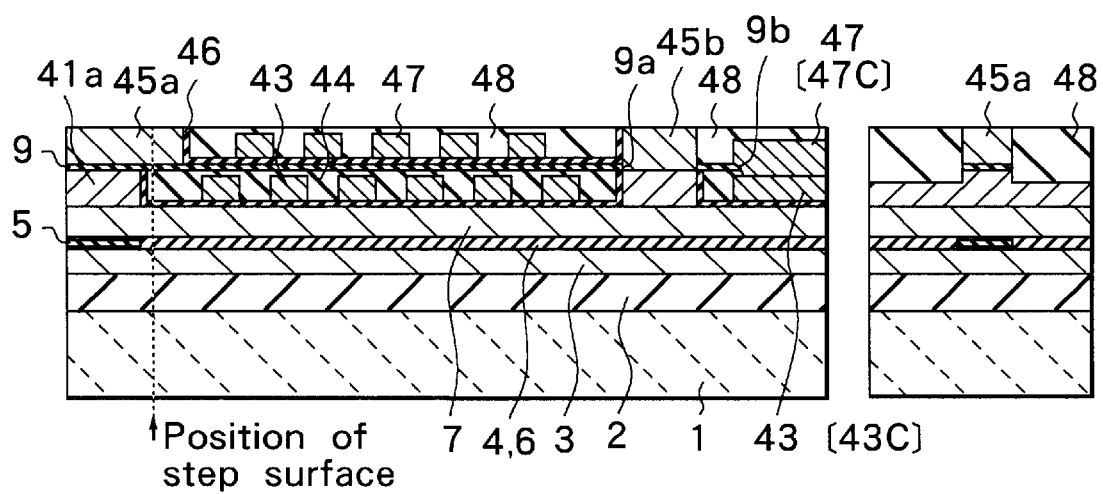
FIGS. 29A and 29B are cross sectional views of the process following the process of FIGS. 28A and 28B.
Figures 30A, 30B:
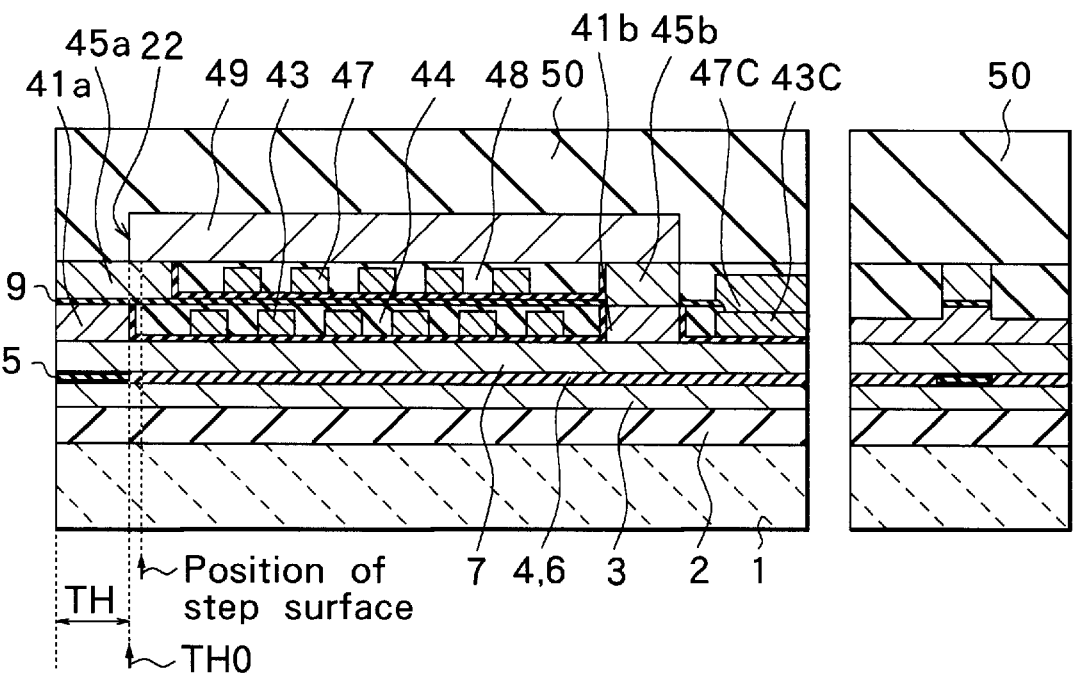
FIGS. 30A and 30B are cross sectional views of the process following the process of FIGS. 29A and 29B.

FIGS. 28A to 30B show the cross section of the head in main processes of the method of manufacturing the thin film magnetic head according to the fourth embodiment of the invention. FIGS. 28A, 29A and 30A show the cross section perpendicular to the air bearing surface. FIGS. 28B, 29B and 30B show the cross section parallel to the air bearing surface in the magnetic pole portion. In these drawings, the same elements as the elements of the above-described embodiments are indicated by the same reference numerals.

In the method of manufacturing the thin film magnetic head according to this embodiment, the processes before the formation of the bottom pole 7 in FIGS. 28A and 28B are the same as those of the above-described first embodiment, and thus the description is omitted.

In this embodiment, as shown in FIGS. 28A and 28B, the formation of the bottom pole 7 is finished, and then a bottom pole chip 41a and a bottom connection portion 41b are formed with a thickness of about 2.0 μm to 2.5 μm on the bottom pole 7. The bottom pole chip 41a is formed so that the end thereof close to the air bearing surface may be located near the position at which the MR (GMR) height is zero. Also, the bottom pole chip 41a is formed so that the side thereof opposite to the air bearing surface may be located at the position at which the throat height is zero. The bottom pole chip 41a and the bottom connection portion 41b may be formed of a plated film such as NiFe or a sputtered film such as FeN, FeZrNP or CoFeN.

Then, an insulating film 42 made of an insulating material such as alumina and having a thickness of 0.3 μm to 0.6 μm is formed over the whole surface by the sputtering or the CVD, for example.

Then, by, for example, the electroplating, first-layer thin film coils 43 made of copper (Cu), for example, for the inductive recording head are formed with a thickness of 1.5 μm to 2.5 μm in a concave region formed between the bottom pole chip 41a and the bottom connection portion 41b. At the same time, a coil connection portion 43C for connecting the thin film coils 43 to the second-layer thin film coils described below is formed in the rear region of the bottom connection portion 41b (the right region in the drawing).

Then, an insulating layer 44 made of the insulating material, e.g., alumina and having a film thickness of 3.0 μm to 4.0 μm is formed over the whole surface by the sputtering. Then, the surface is flattened by the CMP method, for example, whereby the surfaces of the bottom pole chip 41a and the bottom connection portion 41b are exposed.

Then, as shown in FIGS. 29A and 29B, the write gap layer 9 made of, for example, an alumina insulating material and having a film thickness of 0.2 μm to 0.3 μm is formed by the sputtering. The write gap layer 9 may be made of any other material such as aluminum nitride (AlN), silicon oxide or silicon nitride, besides alumina. Then, the write gap layer 9 is patterned by the photolithography, whereby the opening 9a for connecting the top pole to the bottom pole is formed. The write gap layer 9 and the insulating layer 44 are patterned, whereby the opening 9b reaching to the coil connection portion 43C is formed.

Then, a top pole chip 45a and a top connection portion 45b for magnetically connecting the top pole to the bottom pole are formed on the write gap layer 9. At this time, the top connection portion 45b is formed so as to overlap and be in contact with the bottom connection portion 41b. On the other hand, the top pole chip 45a is formed so as to extend rearward from the air bearing surface and be longer than the bottom pole chip 41a. Moreover, the top pole chip 45a is formed so as to have the intermediate portion 27a(2) for ensuring the magnetic volume, the end portion 27a(1) for defining the track width and the step surface 21 at the coupling portion between the intermediate portion 27a(2) and the end portion 27a(1). The plan shape of the top pole chip 45a is the same as the plan shape of the top pole chip 27a (FIG. 26) of the above-described third embodiment. The top pole chip 45a is formed by using the same photomask as the photomask 88 (FIG. 27A) of the above-described third embodiment. Thus, the corner at the coupling portion between the end portion and the intermediate portion has the sharp edge. The top pole chip 45a is located so that the step surface 21 thereof may be shifted slightly rearward from the position of a rear edge surface of the bottom pole chip 41a (i.e., the TH0 position).

Then, the write gap layer 9 and the bottom pole chip 41a around the top pole chip 45a are etched in self-alignment by using the top pole chip 45a as the mask. That is, the write gap layer 9 is selectively removed by RIE (Reactive Ion Etching) using chlorine gas ($Cl_2$, $CF_4$, $BCl_2$, $SF_6$ or the like) by using the top pole chip 45a as the mask, and then the exposed bottom pole chip 41a is again etched by about 0.3 $\mu$m to 0.6 $\mu$m by the ion milling using Ar, for example, whereby the trim structure is formed.

Then, an insulating layer 46 of about 0.3 $\mu$m to 0.6 $\mu$m thick made of, for example, alumina is formed over the whole surface by the sputtering or the CVD, for example. Then, by, for example, the electroplating, second-layer thin film coils 47 made of copper (Cu), for example, for the inductive recording head are formed with a thickness of 1.5 $\mu$m to 2.5 $\mu$m on the insulating layer 46 in the concave region formed of the top pole chip 45a and the top connection portion 45b. At the same time, a coil connection portion 47C to be brought into contact with the coil connection portion 43C through the opening 9b is formed.

Then, an insulating layer 48 of about 3 $\mu$m to 4 $\mu$m thick made of, for example, alumina is formed over the whole surface by the sputtering or the CVD, for example. The insulating layer 48 and the insulating layer 46 are not limited to alumina and may be made of any other insulating material such as silicon dioxide ($SiO_2$) or silicon nitride (SiN).

Then, the insulating layer 48 and the insulating layer 46 are polished by, for instance, the CMP method so that the surfaces of the top pole chip 45a and the top connection portion 45b may be exposed, whereby the surfaces of the insulating layer 48 and the insulating layer 46 and the surfaces of the top pole chip 45a and the top connection portion 45b are flattened so as to form the same surface.

Then, as shown in FIGS. 30A and 30B, a top pole 49 is selectively formed with a thickness of about 3 $\mu$m to 4 $\mu$m by the method such as the electroplating method or the sputtering by using the same material as the material of the top pole chip 45a, for example. In this case, the top pole 49 is formed so that a part of the top pole 49 may overlap a part of the top pole chip 45a and so that the position of the front edge surface 22 of the top pole 49 (the edge surface close to the air bearing surface) may match the position of the rear edge of the bottom pole chip 41a (i.e., the TH0 position). Moreover, the top pole 49 is formed so that the rear end of the top pole 49 may be located on the top connection portion 45b. Thus, the top pole 49 is magnetically coupled to the top pole chip 45a and magnetically coupled to the bottom pole 7 through the top connection portion 45b and the bottom connection portion 41b.

Finally, an overcoat layer 50 of about 30 $\mu$m thick made of alumina is formed by, for example, the sputtering so that the whole surface may be coated with the overcoat layer 50. Then, the slider is machined, whereby the air bearing surface (ABS) of the recording head and the reproducing head is formed. As a result, the thin film magnetic head is completed.

Also in this embodiment, the write track width is narrowed, and thus the occurrence of the sidelight phenomenon can be effectively prevented. Moreover, the magnetic volume is ensured immediately at the rear of the coupling portion, and thus the sufficient overwrite properties can be ensured.

Moreover, in this embodiment, the whole top pole chip 45a is formed on the flat portion, and thus the photoresist pattern can be formed with higher accuracy by the photolithography. Moreover, the top pole 49 can be formed on the flat portion subjected to CMP, and therefore high-accuracy patterning can be achieved.

Figures 31A, 31B:
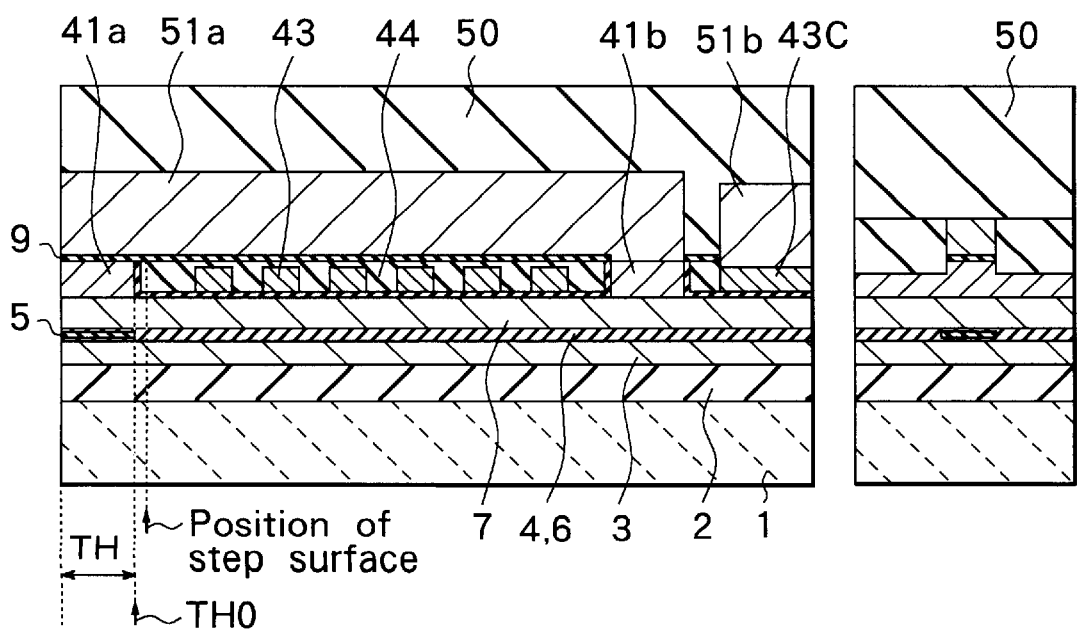
FIGS. 31A and 31B are cross sectional views of an alternative to the thin film magnetic head formed by the method of manufacturing the thin film magnetic head according to the fourth embodiment.

Although the two-layer thin film coils 43 and 47 are formed in this embodiment, only the single-layer thin film coils 43 may be formed as shown in FIG. 31A, for example. In this case, the openings 9a and 9b (FIG. 29A) for connection are formed in the write gap layer 9. Then, a top pole 51a is formed in the region from the write gap layer 9 to the opening 9a, and a magnetic layer 51b is formed on the coil connection portion 43C exposed in the opening 9b. Furthermore, the overcoat layer 50 is formed so that the top pole 51a and the magnetic layer 51b may be coated with the overcoat layer 50. The subsequent processes are the same as the above-mentioned processes.

[Fifth Embodiment]

Figures 34A, 34B:
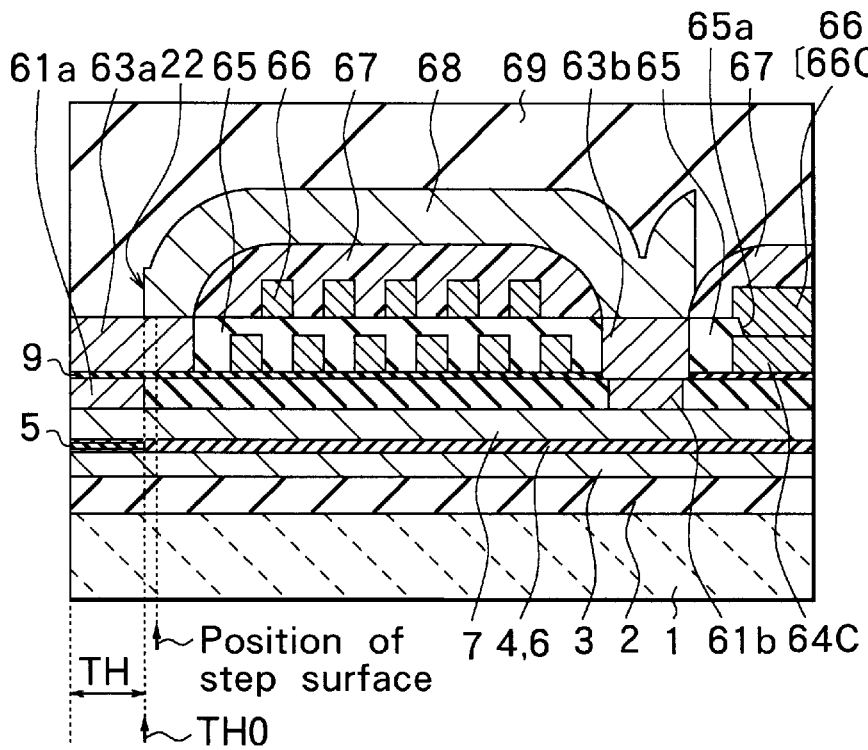
FIGS. 34A and 34B are cross sectional views of the process following the process of FIGS. 33A and 33B.
Figures 35A, 35B:
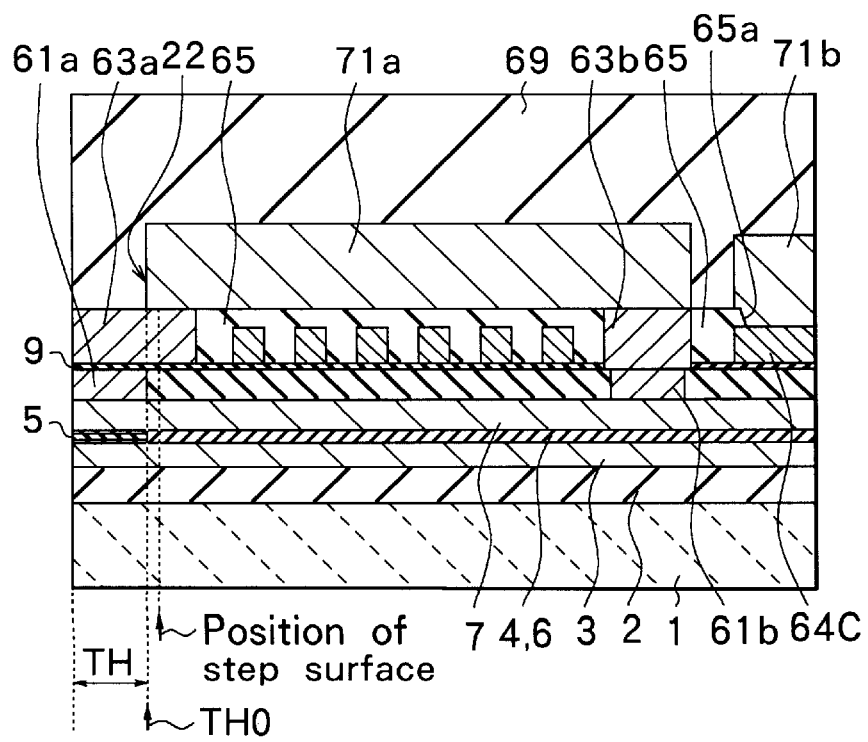
FIGS. 35A and 35B are cross sectional views of an alternative to the thin film magnetic head formed by the method of manufacturing the thin film magnetic head according to the fifth embodiment.
Figure 36:
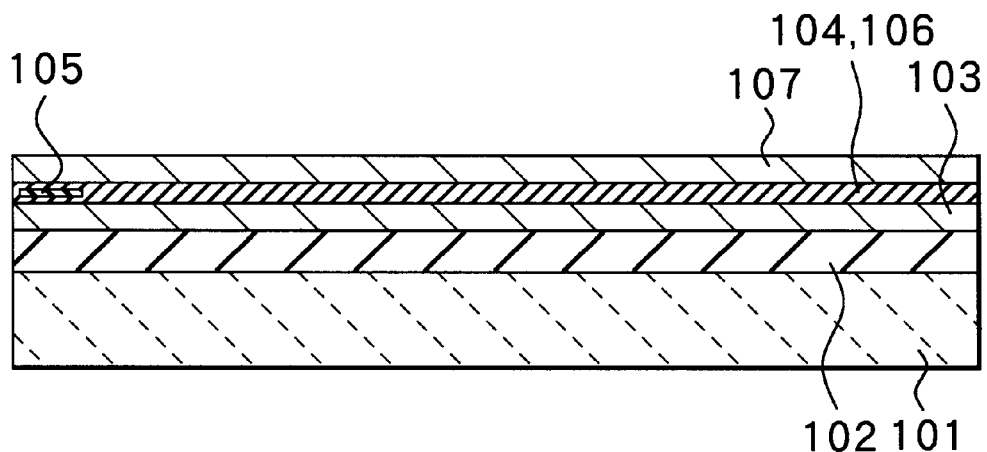
FIG. 36 is a cross sectional view for describing one process of the conventional method of manufacturing the thin film magnetic head.
Figure 37:
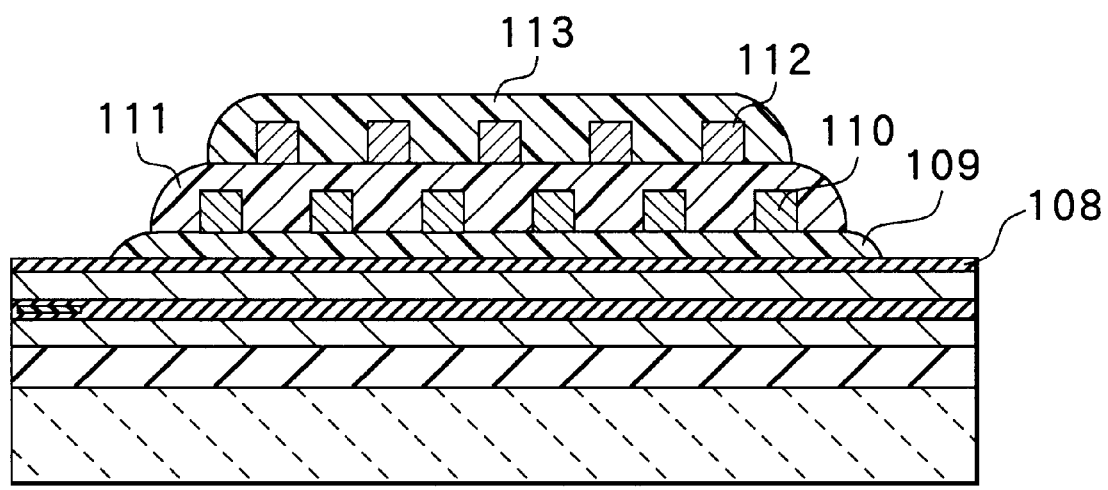
FIG. 37 is a cross sectional view for describing the process following the process of FIG. 36.
Figure 38:
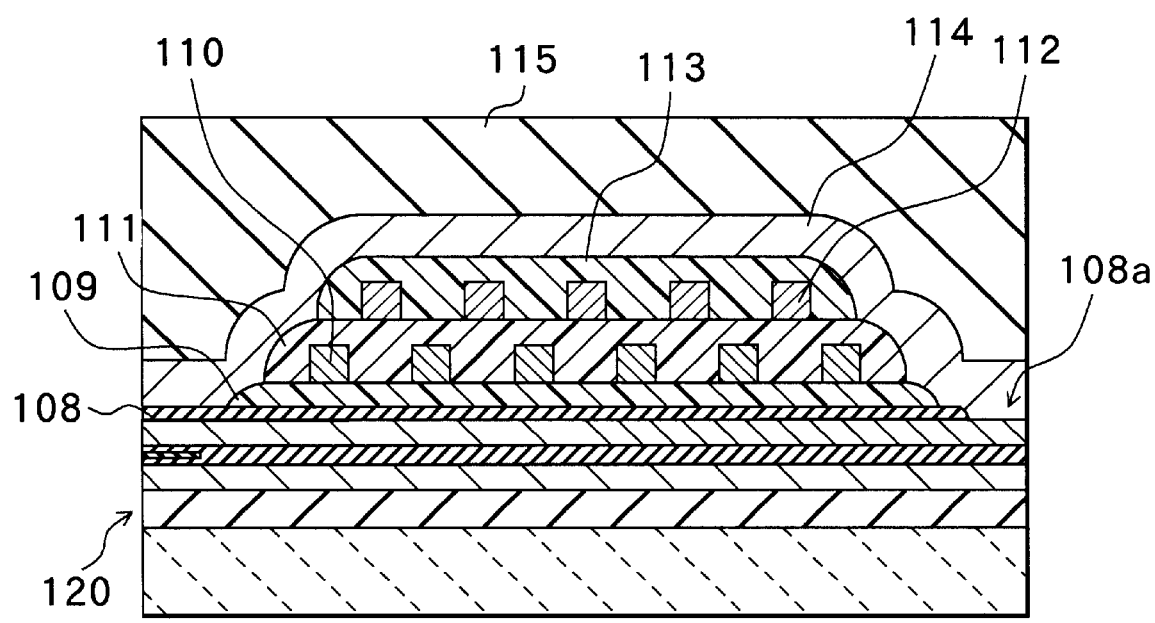
FIG. 38 is a cross sectional view for describing the process following the process of FIG. 37.
Figure 39:
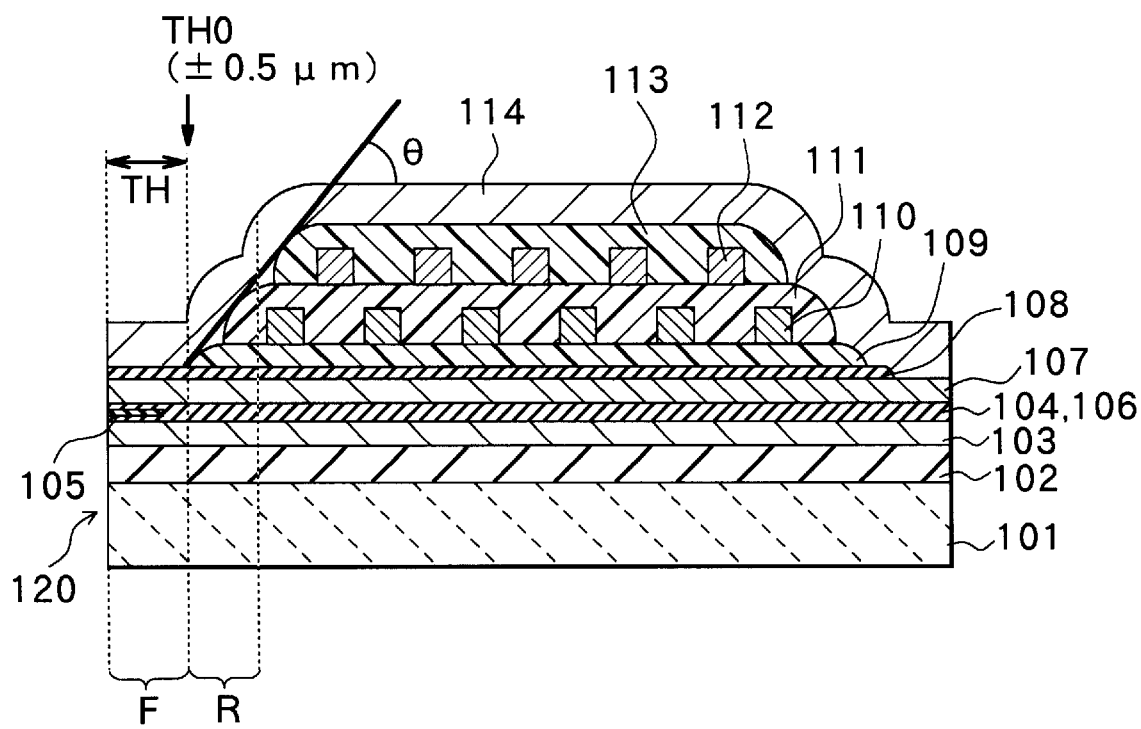
FIG. 39 is a cross sectional view of the structure of the conventional thin film magnetic head.

Next, the method of manufacturing the thin film magnetic head according to a fifth embodiment of the invention will be described with reference to FIGS. 32A to 34B. FIGS. 32A, 33A and 34A show the cross section perpendicular to the air bearing surface. FIGS. 32B, 33B and 34B show the cross section parallel to the air bearing surface in the magnetic pole portion. In these drawings, the same elements as the elements of the above-described embodiments are indicated by the same reference numerals.

In this embodiment, the processes before the formation of the bottom pole 7 in FIGS. 32A and 32B are the same as those of the above-described first embodiment, and thus the description is omitted.

In this embodiment, as shown in FIGS. 32A and 32B, the formation of the bottom pole 7 is finished, and then a bottom pole chip 61a and a bottom connection portion 61b are formed on the bottom pole 7. The bottom pole chip 61a is formed so that the end thereof close to the air bearing surface may be located near the position at which the MR (GMR) height is zero. Also, the bottom pole chip 61a is formed so that the side thereof opposite to the air bearing surface may be located at the position at which the throat height is zero.

Then, an insulating layer 62 of 3.0 $\mu$m to 4.0 $\mu$m thick made of the insulating material, e.g., alumina is formed over the whole surface by the sputtering. Then, the surface is flattened by the CMP, for example, whereby the surfaces of the bottom pole chip 61a and the bottom connection portion 61b are exposed.

Then, as shown in FIGS. 33A and 33B, the write gap layer 9 of 0.2 $\mu$m to 0.3 $\mu$m thick made of the insulating material such as alumina is formed by the sputtering. Then, the write gap layer 9 is patterned by the photolithography, whereby the opening 9a for connecting the top pole to the bottom pole is formed.

Then, a top pole chip 63a and a top connection portion 63b for magnetically connecting the top pole to the bottom pole are formed on the write gap layer 9. At this time, the top connection portion 63b is formed so as to overlap and be in contact with the bottom connection portion 61b. On the other hand, the top pole chip 63a is formed so as to extend rearward from the air bearing surface and be longer than the bottom pole chip 61a. The top pole chip 63a is formed so as to have the same plan shape as the plan shape shown in FIG. 27C. The top pole chip 63a is formed by using the same photomask as the photomask shown in FIG. 27A. The top pole chip 63a is located so that the step surface 21 thereof may be shifted slightly rearward from the position of the rear edge surface of the bottom pole chip 61a (i.e., the TH0 position).

Then, the write gap layer 9 and the bottom pole chip 61a around the top pole chip 63a are etched in self-alignment by using the top pole chip 63a as the mask, whereby the trim structure is formed.

Then, by, for example, the electroplating, first-layer thin film coils 64 made of copper (Cu), for example, for the inductive recording head are formed with a thickness of 1.5 μm to 2.5 μm on the write gap layer 9 in the concave region formed between the top pole chip 63a and the top connection portion 63b. At the same time, a coil connection portion 64C for connecting the thin film coils 64 to the second-layer thin film coils described below is formed in the rear region of the top connection portion 63b (the right region in the drawing).

Then, as shown in FIGS. 34A and 34B, an insulating layer 65 of 3.0 μm to 4.0 μm thick made of the insulating material such as alumina is formed over the whole surface by the sputtering. Then, the surface is flattened by the CMP method, for example, whereby the surfaces of the top pole chip 63a and the top connection portion 63b are exposed.

Then, the insulating layer 65 is selectively etched, whereby an opening 65a reaching to the coil connection portion 64C is formed.

Then, second-layer thin film coils 66 made of copper (Cu), for example, for the inductive recording head are formed with a thickness of 1.5 μm to 2.5 μm on the insulating layer 65 by the electroplating, for example. At the same time, a coil connection portion 66C to be brought into contact with the coil connection portion 64C through the opening 65a is formed.

Then, a photoresist layer 67 is formed by the high-accuracy photolithography so that the thin film coils 66 and the coil connection portion 64C may be coated with the photoresist layer 67. Then, the heat treatment takes place at a temperature of 250° C., for example, in order to flatten the surface of the photoresist layer 67 and provide insulation among the thin film coils 66. Then, a top pole 68 is selectively formed with a thickness of about 3 μm to 4 μm by the method such as the electroplating by using the same material as the material of the top pole chip 45a, for example. In this case, the top pole 68 is formed so that a part of the top pole 68 may overlap a part of the top pole chip 63a and so that the position of the front edge surface 22 of the top pole 68 (the edge surface close to the air bearing surface) may match the position of the rear edge of the bottom pole chip 61a (i.e., the TH0 position). Moreover, the top pole 68 is formed so that the rear end of the top pole 68 may be located on the top connection portion 63b. Thus, the top pole 68 is magnetically coupled to the top pole chip 63a and magnetically coupled to the bottom pole 7 through the top connection portion 63b and the bottom connection portion 61b.

Finally, an overcoat layer 69 of about 30 μm thick made of alumina is formed by, for example, the sputtering so that the whole surface may be coated with the overcoat layer 69. Then, the slider is machined, whereby the air bearing surface (ABS) of the recording head and the reproducing head is formed. As a result, the thin film magnetic head is completed.

This embodiment achieves the same functions and effects as the above-described embodiments achieve. That is, the write track width on the recording medium is precisely controlled, and thus the occurrence of the sidelight phenomenon can be effectively prevented. Moreover, the sufficient overwrite properties can be ensured.

Moreover, also in this embodiment, the top pole chip 63a can be formed on the flat portion, and thus the photoresist pattern can be formed with high accuracy by the photolithography.

Although the invention has been described above by referring to some embodiments, the invention is not limited to these embodiments and various modifications of the invention are possible. For example, the method of manufacturing the composite thin film magnetic head has been described in the above-mentioned embodiments and modifications thereof. However, the invention can be applied to the record-only thin film magnetic head having an inductive magnetic transducer for writing or the thin film magnetic head having the inductive magnetic transducer for both of recording and reproducing. Moreover, the invention can be applied to the thin film magnetic head having the structure in which the element for writing and the element for reading are laminated in reverse order.

As described above, according to the method of manufacturing the thin film magnetic head of the invention, for forming the photoresist pattern by photolithography process, the light-shield mask for use in the photolithography process has the concave or convex pattern at the position corresponding to the corner of the step of the coupling portion between the first and second magnetic layer portions of one magnetic layer. Thus, the presence of the pattern allows the exposure of the corner to be controlled and made correct. Thus, the photoresist pattern can be prevented from being rounded at the portion corresponding to the corner of the step along the width at the coupling portion. Therefore, the corner has a sharp edge shape. Consequently, the increase in a substantial width of the first magnetic layer portion for defining the track width can be avoided, and thus the effect of being capable of narrowing the write track width is achieved. Moreover, the presence of the second magnetic layer having a high magnetic volume can prevent the saturation of the magnetic flux flowing into the first magnetic layer, and thus the effect of improving the overwrite properties is achieved.

More particularly, according to the method of manufacturing the thin film magnetic head of the invention, the light-shield mask whose pattern portion corresponding to the first magnetic layer portion has a fixed width is used as the light-shield mask. Thus, the width of the first magnetic layer portion is fixed along the length thereof, and therefore the effect of being capable of reducing variation in an effective write track width finally obtained is achieved.

Moreover, according to the method of manufacturing the thin film magnetic head of the invention, the light-shield mask having the shape, which enables the direction of the step surface of the second magnetic layer portion at the coupling portion to be perpendicular to the direction in which the first magnetic layer portion extends, is used as the light-shield mask. Thus, the effect of being capable of further sharpening the edge of the corner of the step at the coupling portion between the first and second magnetic layer portions is achieved.

Moreover, according to the method of manufacturing the thin film magnetic head of the invention, the light-shield mask is positioned so that the position of the step of the coupling portion may match the position of the edge portion of the insulating layer close to the recording medium, and then the photolithography process is performed. Therefore, the effect of improving recording properties of the obtained thin film magnetic head is achieved.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head comprising at least two magnetic layers magnetically coupled to each other and having a part facing a recording medium, the part including two magnetic poles facing each other with a gap layer sandwiched therebetween; and a thin film coil portion located between these at least two magnetic layers with an insulating layer sandwiched therebetween, wherein at least one of the two magnetic layers has a first magnetic layer portion extending from a surface facing the recording medium to an edge portion of the insulating layer close to the recording medium or to near the edge portion and having a fixed width for defining a write track width on the recording medium; a second magnetic layer portion having the width larger than the width of the first magnetic layer portion and magnetically coupled to the first magnetic layer portion at the edge portion of the insulating layer or near the edge portion; and a step along the width formed at a coupling portion between the first magnetic layer portion and the second magnetic layer portion, the method comprising the steps of:

performing a photolithography process by using a light-shield mask having a basic shape corresponding to the shapes of the first magnetic layer portion and the second magnetic layer portion and having a concave or convex pattern at a corner corresponding to the step of the coupling portion, thereby forming a photoresist pattern having a predetermined shape; and selectively forming the one magnetic layer by using the photoresist pattern.

2. A method of manufacturing a thin film magnetic head according to claim 1, wherein a negative photoresist, which allows a region exposed by the photolithography process to remain, is used as the photoresist.

3. A method of manufacturing a thin film magnetic head according to claim 2, wherein the light-shield mask having the concave pattern for reducing an exposure of the corner is used as the light-shield mask.

4. A method of manufacturing a thin film magnetic head according to claim 1, wherein a positive photoresist, which allows the region not exposed by the photolithography process to remain, is used as the photoresist.

5. A method of manufacturing a thin film magnetic head according to claim 4, wherein the light-shield mask having the convex pattern for reducing the exposure of the corner is used as the light-shield mask.

6. A method of manufacturing a thin film magnetic head according to claim 1, wherein the light-shield mask whose pattern portion corresponding to the first magnetic layer portion has a fixed width is used as the light-shield mask.

7. A method of manufacturing a thin film magnetic head according to claim 1, wherein the one magnetic layer further includes a third magnetic layer portion magnetically coupled to the second magnetic layer portion and having the width and area larger than the width and area of the second magnetic layer portion, and all of the first, second and third magnetic layer portions are integrally formed by using the light-shield mask having the shape corresponding to all of the first, second and third magnetic layer portions.

8. A method of manufacturing a thin film magnetic head according to claim 1, wherein the one magnetic layer further includes a third magnetic layer portion magnetically coupled to the second magnetic layer portion and having the width and area larger than the width and area of the second magnetic layer portion, and the first and second magnetic layer portions are formed by using the light-shield mask having the shape corresponding to the first and second magnetic layer portions, and then the third magnetic layer portion is separately formed by using a second light-shield mask having the shape corresponding to the third magnetic layer portion.

9. A method of manufacturing a thin film magnetic head according to claim 1, wherein the light-shield mask having the shape, which enables the direction of a step surface of the second magnetic layer portion at the coupling portion to be perpendicular to the direction in which the first magnetic layer portion extends, is used as the light-shield mask.

10. A method of manufacturing a thin film magnetic head according to claim 1, wherein the light-shield mask is positioned so that the position of the step of the coupling portion may match the position of the edge portion of the insulating layer close to the recording medium, and then the photolithography process is performed.

11. A method of manufacturing a thin film magnetic head according to claim 1, wherein the concave or convex pattern has straight contours.

12. A method of manufacturing a thin film magnetic head according to claim 11, wherein the concave or convex pattern has contours forming a part of a rectangle.

13. A method of manufacturing a thin film magnetic head according to claim 12, wherein one side of the rectangle has a length of 0.1 $\mu$m to 0.7 $\mu$m, and the other side perpendicular to the one side has a length of 0.3 $\mu$m to 2.5 $\mu$m.

14. A method of manufacturing a thin film magnetic head according to claim 1, wherein the concave or convex pattern has smoothly curved contours.

15. A method of manufacturing a thin film magnetic head according to claim 14, wherein the concave or convex pattern has contours forming a part of a circle or an ellipse.

* * * * *